(12) United States Patent
Ivanov et al.

(10) Patent No.: US 10,509,098 B2
(45) Date of Patent: Dec. 17, 2019

(54) SUPPORTING THE USE OF RADIO MAPS

(71) Applicant: HERE GLOBAL B.V., Eindhoven (NL)

(72) Inventors: Pavel Ivanov, Tampere (FI); Jari Syrjärinne, Tampere (FI); Muhammad Irshan Khan, Tampere (FI); Lauri Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/567,663

(22) PCT Filed: Apr. 23, 2015

(86) PCT No.: PCT/EP2015/058798
§ 371 (c)(1),
(2) Date: Oct. 19, 2017

(87) PCT Pub. No.: WO2016/169601
PCT Pub. Date: Oct. 27, 2016

(65) Prior Publication Data
US 2018/0120410 A1 May 3, 2018

(51) Int. Cl.
*H04B 17/00* (2015.01)
*G01S 5/02* (2010.01)
(Continued)

(52) U.S. Cl.
CPC ........ *G01S 5/0252* (2013.01); *G06F 3/04842* (2013.01); *G06F 3/04847* (2013.01); *G06T 11/203* (2013.01)

(58) Field of Classification Search
CPC ........ H04W 64/00–006; H04W 4/023; H04W 4/029; G01S 5/0036; G01S 5/0263;
(Continued)

(56) References Cited

U.S. PATENT DOCUMENTS

| 7,158,790 | B1 * | 1/2007 | Elliott | H04W 16/00 455/446 |
| 2009/0117851 | A1 * | 5/2009 | Malaney | H04W 16/18 455/67.11 |

(Continued)

FOREIGN PATENT DOCUMENTS

| EP | 1754385 B2 | 2/2007 |
| WO | WO-2005/117470 | 12/2005 |

OTHER PUBLICATIONS

International Preliminary Report on Patentability (Chapter 1) for International Patent Application No. PCT/EP2015/058798 dated Oct. 24, 2017, 8 pages.

(Continued)

*Primary Examiner* — Md K Talukder
(74) *Attorney, Agent, or Firm* — Alston & Bird LLP

(57) ABSTRACT

Results of measurements by a mobile device on radio signals transmitted by at least one transmitter are obtained. The results of measurements comprise characteristics of the radio signals at each of a plurality of locations of measurements at a particular site, and indications of the locations of measurement. The results of measurement and the indications of the locations are provided and used as a basis for a generation of a radio map for use in supporting a positioning of mobile devices at the site. In addition, a user input to the mobile device is detected, the user input defining a localization area at the site that is to be covered by the radio map. A representation of the defined localization area is provided in addition for use in connection with the radio map.

22 Claims, 12 Drawing Sheets

(51) Int. Cl.
*G06F 3/0484* (2013.01)
*G06T 11/20* (2006.01)

(58) Field of Classification Search
CPC .... G01S 5/06; G01S 3/04842; G01S 3/04847; G01S 5/0252; G06F 3/04842; G06F 3/04847; G06T 11/203
USPC ............... 455/41.1, 41.2, 41.3, 67.11, 68, 71
See application file for complete search history.

(56) References Cited

U.S. PATENT DOCUMENTS

| | | | |
|---|---|---|---|
| 2009/0278839 A1* | 11/2009 | Geis | G06Q 10/06 345/418 |
| 2012/0015665 A1* | 1/2012 | Farley | G01S 5/0036 455/456.1 |
| 2014/0128093 A1* | 5/2014 | Das | H04W 64/006 455/456.1 |
| 2015/0061938 A1* | 3/2015 | Moraleda | G01S 5/0294 342/452 |
| 2015/0148057 A1* | 5/2015 | Pakzad | H04W 52/0261 455/456.1 |
| 2015/0168154 A1* | 6/2015 | Boerger | G06Q 10/1095 701/410 |
| 2016/0003623 A1* | 1/2016 | Venkatraman | H04W 76/10 701/410 |
| 2016/0161592 A1 | 6/2016 | Wirola et al. | |
| 2016/0323439 A1* | 11/2016 | Tanabe | H04W 4/029 |
| 2016/0327629 A1* | 11/2016 | Pandharipande | H04W 4/023 |
| 2017/0371023 A1* | 12/2017 | Syrjarinne | H04W 4/025 |
| 2018/0275261 A1* | 9/2018 | Khan | G01S 11/06 |
| 2018/0306894 A1* | 10/2018 | Koskimies | G01S 5/0278 |

OTHER PUBLICATIONS

International Search Report and Written Opinion of the Searching Authority for International Patent Application No. PCT/EP2015/058798 dated Jun. 25, 2015, 9 pages.

\* cited by examiner

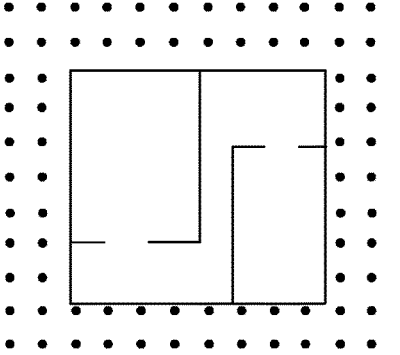
FIG. 7e Building A, Outdoor Area
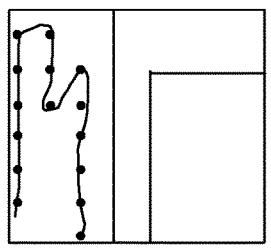
FIG. 7b Building A, 2nd Floor
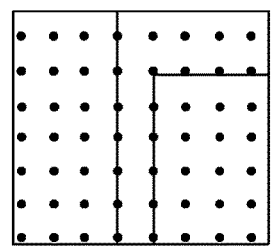
FIG. 7d Building A, 2nd Floor
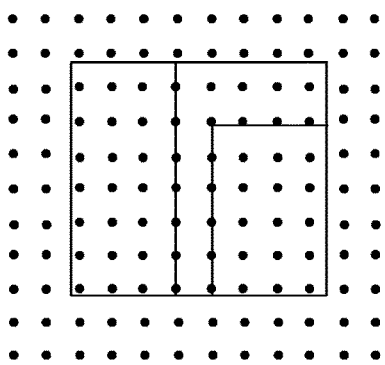
FIG. 7a Building A, 2nd Floor
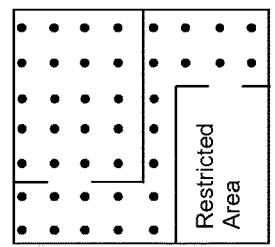
FIG. 7c Building A, 1st Floor

SUPPORTING THE USE OF RADIO MAPS

FIELD OF THE DISCLOSURE

The invention relates to the field of positioning and more specifically to supporting the use of radio maps that are generated for positioning mobile devices.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices as assistance data for use in position determinations. Alternatively, model data and/or radio map data may be stored in a positioning server to which the mobile devices may connect to for obtaining position information. In addition to the current location of the mobile device, the available data may be used in the positioning stage for estimating other position related information, like velocity and heading of the mobile device.

A similar approach could be used for a positioning that is based on other types of terrestrial transmitters or on a combination of different types of terrestrial transmitters.

SUMMARY OF SOME EMBODIMENTS OF THE INVENTION

For a first aspect of the invention, an example embodiment of a method comprises, performed by at least one apparatus, obtaining results of measurements by a mobile device on radio signals transmitted by at least one transmitter, the results of measurements comprising characteristics of the radio signals at each of a plurality of locations of measurements at a particular site, and indications of the locations of measurement. The method further comprises providing the results of measurement and the indications of the locations as a basis for a generation of a radio map for use in supporting a positioning of mobile devices at the site. The method further comprises detecting in addition a user input to the mobile device, the user input defining a localization area at the site that is to be covered by the radio map. The method further comprises providing in addition a representation of the defined localization area for use in connection with the radio map.

For a second aspect of the invention, an example embodiment of a method comprises, performed by at least one apparatus, obtaining results of measurements by at least one mobile device on radio signals transmitted by at least one transmitter, the results of measurements comprising characteristics of the radio signals at each of a plurality of locations of measurements at a particular site, and indications of the locations of measurement. The method further comprises generating a radio map for the site based on the obtained results of measurements and the obtained indications of the locations of measurement. The method further comprises obtaining a representation of a localization area at the site, the representation being based on a user input to at least one of the at least one mobile device defining the localization area, wherein the localization area is to be covered by the radio map. The method further comprises providing the radio map for use in supporting a positioning of mobile devices at the site. The method further comprises providing the representation of the localization area for use in connection with the radio map.

An example embodiment of a first apparatus for each aspect of the invention comprises means for performing the actions of any embodiment of the example method presented for the first aspect or the second aspect.

The means of the first apparatus for each aspect of the invention may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus for each aspect of the invention comprises at least one processor and at least one memory including computer program code, the at least one memory and the computer program code configured to, with the at least one processor, cause the apparatus at least to perform the actions of any embodiment of the example method presented for the first aspect or the second aspect.

Any of the described apparatuses may comprise only the indicated components or one or more additional components.

Moreover an example embodiment of a system is presented, which comprises any embodiment of any presented example apparatus of the first aspect and any embodiment of any presented example apparatus of the second aspect. The apparatus of the first aspect may be configured to provide the representation of the localization area to the apparatus of the second aspect.

Moreover an example embodiment of a non-transitory computer readable storage medium, in which computer program code is stored, is presented for each aspect of the invention. The computer program code causes an apparatus to perform the actions of any embodiment of the example method presented for the first aspect or the second aspect when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention according to the first aspect or the second aspect, respectively, as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting the use of radio maps. In certain embodiment, any of the presented apparatuses is an apparatus for supporting the use of radio maps.

It is to be understood that any feature presented for a particular exemplary embodiment may also be used in combination with any other described exemplary embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 7*a-e* are diagrams illustrating example details of the operations of FIG. 5;

DETAILED DESCRIPTION OF THE FIGURES

Figure 1:
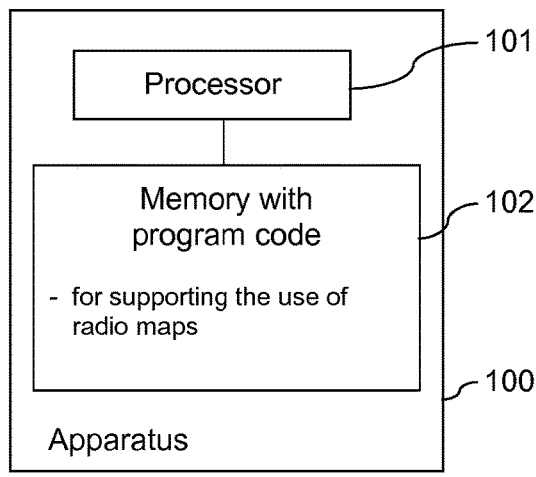
FIG. 1 is a schematic block diagram of an example embodiment of an apparatus according to the first and/or second aspect.

FIG. 1 is a schematic block diagram of an example embodiment of an apparatus 100 according to the first or second aspect of the invention. Apparatus 100 comprises a processor 101 and, linked to processor 101, a memory 102. Memory 102 stores computer program code for supporting the use of radio maps in line with the first or second aspect of the invention, respectively. Processor 101 is configured to execute computer program code stored in memory 102 in order to cause an apparatus to perform desired actions.

For the first aspect, apparatus 100 may be a mobile device, like a mobile communication device. For the second aspect, apparatus 100 may be a stationary device, like a dedicated assistance data assembling server or some other server, or a mobile device, like a mobile communication device. A stationary device is configured to be stationary when in operation. A mobile device is configured to enable operation while the device is moving. Apparatus 100 may equally be a module, like a chip, circuitry on a chip or a plug-in board, for a device. Optionally, apparatus 100 may comprise various other components, like a data interface, a user interface, a further memory, a further processor, etc.

An example operation of apparatus 100 will now be described with reference to the flow chart of FIG. 2. The operation is an example embodiment of a method according to the first aspect of the invention. Processor 101 and the program code stored in memory 102 cause an apparatus to perform the operation when program code according to the first aspect of the invention is retrieved from memory 102 and executed by processor 101. The apparatus that is caused to perform the operation may be apparatus 100 or some other apparatus, for example but not necessarily a device comprising apparatus 100.

The apparatus obtains results of measurements by a mobile device on radio signals transmitted by at least one transmitter, the results of measurements comprising characteristics of the radio signals at each of a plurality of locations of measurements at a particular site, and indications of the locations of measurement. (action 201) A set of results of measurements at a particular location in combination with an indication of the location of measurement is also referred to as a fingerprint.

The apparatus furthermore provides the results of measurement and the indications of the locations as a basis for a generation of a radio map for use in supporting a positioning of mobile devices at the site. (action 202) A radio map may indicate characteristics of radio signals transmitted by at least one transmitter that can be expected to be detected at each of a plurality of locations. The results of measurement and the indications of the locations may be provided to enable the apparatus or a device comprising the apparatus to generate the radio map, or they may be provided for transmission to another device, like a server. It is to be understood that separate radio maps may be generated for different areas of a site.

The apparatus detects in addition a user input to the mobile device, the user input defining a localization area at the site that is to be covered by the radio map. (action 203) It is to be understood that different localization areas to be covered by different radio maps may be defined per site.

The apparatus provides in addition a representation of the defined localization area for use in connection with the radio map. (action 204) The representation may correspond to the definition of the localization by the user or to a processed version of this definition. The representation may be provided for use by the apparatus or by a device comprising the apparatus, or it may be provided for transmission to another device, like a server.

Another example operation of apparatus 100 will now be described with reference to the flow chart of FIG. 3. The operation is an example embodiment of a method according to the second aspect of the invention. Processor 101 and the program code stored in memory 102 cause an apparatus to perform the operation when the program code according to the second aspect of the invention is retrieved from memory 102 and executed by processor 101. The apparatus that is caused to perform the operation may be apparatus 100 or some other apparatus, for example but not necessarily a device comprising apparatus 100.

The apparatus obtains results of measurements by at least one mobile device on radio signals transmitted by at least one transmitter, the results of measurements comprising characteristics of the radio signals at each of a plurality of locations of measurements at a particular site, and indications of the locations of measurement. (action 211)

The apparatus furthermore generates a radio map for the site based on the obtained results of measurements and the obtained indications of the locations of measurement. (action 212) Again, it is to be understood that separate radio maps may be generated for different areas of a site.

The apparatus furthermore obtains a representation of a localization area at the site, the representation being based on a user input to at least one of the at least one mobile device defining the localization area, wherein the localization area is to be covered by the radio map. (action 213) It is to be understood that representations of different localization areas may be obtained per site.

The apparatus furthermore provides the radio map for use in supporting a positioning of mobile devices at the site. (action 214) Such a positioning may be performed by the same apparatus or by any other apparatus.

The apparatus furthermore provides the representation of the localization area for use in connection with the radio map. (action 215) The representation of the localization area may be used in connection with the radio map by the same apparatus or by any other apparatus.

It is to be understood that in some example embodiments, apparatus 100 may be an apparatus according to the first and second aspect of the invention and thus be configured to support an embodiment of the method according to the first aspect of the invention and as well an embodiment of the method according to the second aspect of the invention.

The quality of an indoor positioning which is based on collected fingerprints may depend on the coverage and quality of radio maps that are generated based on the fingerprint data. Collecting fingerprints via crowd-sourcing may result in a large number of fingerprints; however, this may mean for some areas that more fingerprints have to be processed than needed, while other areas that are rarely visited may not be represented at all. Therefore, collecting agents may be recruited to survey particular sites in a systematic manner, in order to increase the coverage at these sites. Such sites may comprise for instance a building or some other venue that is important for a company or an association of companies. Examples for large sites may be for instance huge shopping malls or a business center with tens of floors. The invention proceeds from the consideration that it may be difficult to determine the true coverage and quality of a radio map that is generated based on fingerprint data. For example, if a collecting agent surveys a first floor based on a floor plan or a displayed image, the plan or displayed image may cover a wider area than the actual floor. If the floor plan is not provided in vector format, it may not be possible to determine automatically, which part of the floor plan actually covers the currently surveyed floor. In this case, measurements at locations outside of the first floor may be considered to be missing when checking the quality of the radio map for the first floor, even though such measurements are not relevant for determining positions on the first floor. Furthermore, for example, there may be some restricted areas that are not available to the public on a floor. In this case, measurements at locations within the restricted areas may be considered to be missing, even though such measurements may not be obtainable and even though such measurements are not relevant for positioning purposes. Similarly, for example, there may be some open spaces on a floor in which measurements cannot be performed, but in which a support of a positioning is not required either. Still, also in this case, measurements may be considered to be missing when evaluating a radio map that is generated based on collected measurements. Furthermore, separate collections of fingerprints may be performed for indoor and outdoor areas, for example on the ground floor. In this case, measurements indoors may be considered to be missing from an outdoor survey and outdoor measurements may be considered to be missing from an indoor survey.

Certain embodiments of the first aspect of the invention therefore provide that a mobile device may not only be enabled to collect and provide fingerprint data that may be used for generating a radio map, which may in turn be used for supporting a positioning of other mobile devices. The same mobile device may also be enabled to allow and detect a user input defining a localization area that is to be covered by a particular collection of fingerprints and thus by a particular radio map, and to provide corresponding information for use in connection with a radio map. The localization area is defined explicitly and independently from fingerprint data; that is, it may not be deduced automatically from the fingerprint data.

Certain embodiments of the second aspect of the invention provide that an apparatus may not only obtain fingerprint data from at least one mobile device and generate a radio map based on this data. It may also obtain and provide a representation of a localization area that is to be covered by a particular collection of fingerprints and thus by a particular radio map according to a user input to one of the mobile devices taking part in the collection of fingerprints. Again, the localization area is defined explicitly and independently from fingerprint data. The representation of the localization area may be used internally or externally in connection with a radio map.

Certain embodiments of the invention may thus have the effect that a radio map that may be generated based on collected fingerprints may be evaluated and used in a more targeted manner, since zones of a site which do not belong to a localization area for some reason can be excluded from consideration so that they do not distort the results of the evaluation or use. Ensuring that a user of a mobile device that is used for collecting fingerprint data is enabled to define the localization area takes account of the fact that such a localization area can often not be defined automatically based on given data.

Figure 2:
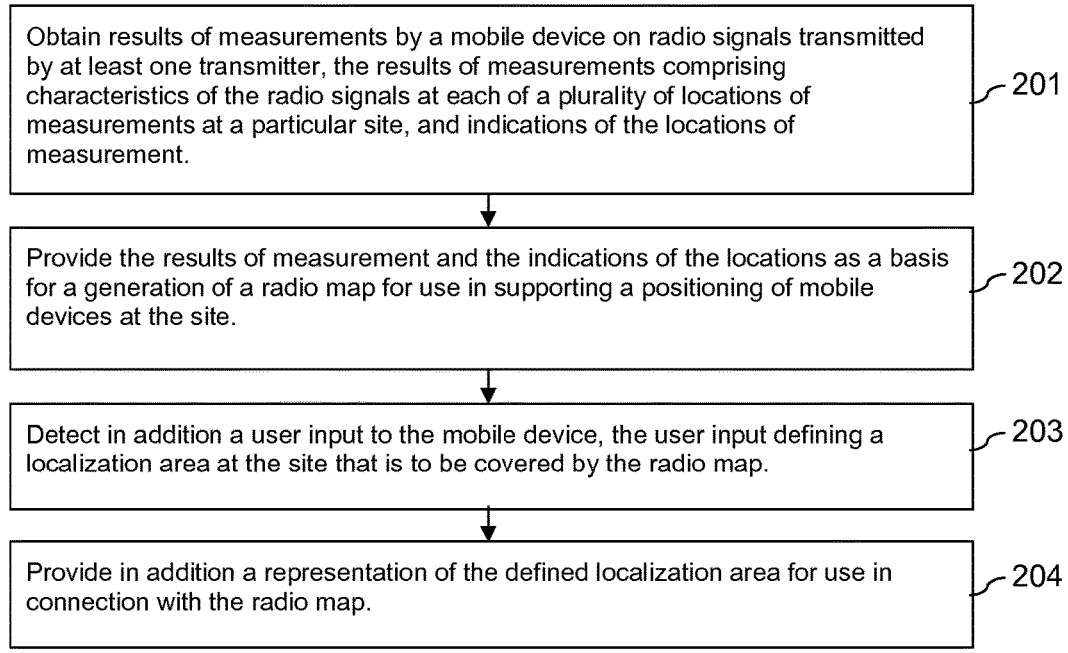
FIG. 2 is a flow chart illustrating an example embodiment of a method according to the first aspect.
Figure 3:
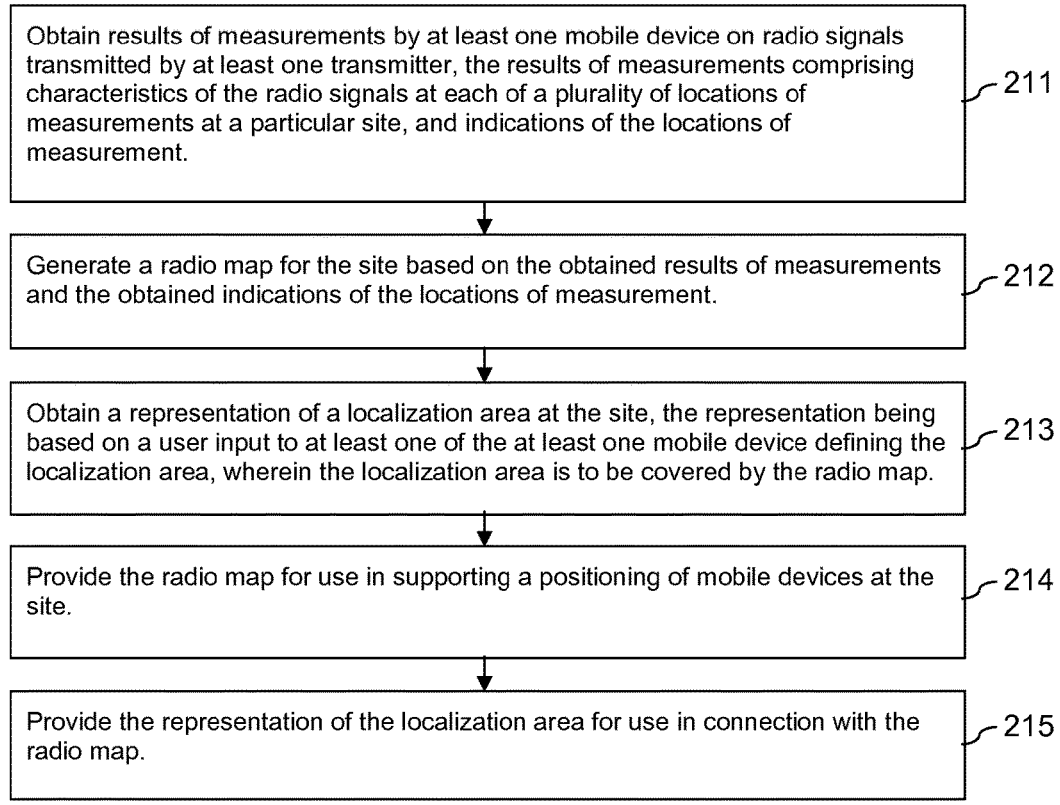
FIG. 3 is a flow chart illustrating an example embodiment of a method according to the second aspect.

Apparatus 100 illustrated in FIG. 1 and the methods illustrated in FIGS. 2 and 3 may be implemented and refined in various ways.

The user input defining the localization area may be enabled and detected at any one of different points of time with either aspect, for instance before the start of measurements at a site starts, after a first survey of the site has been completed or after the survey of the site has been stopped completely for the time being. In an example embodiment, the user input is detected before results of measurements on radio signals are obtained. This may have the effect that a user of the mobile device may be supported in the collection of measurements from the start of the survey, for example by presenting the localization area on the display and/or by giving a continuous update on a quality of survey that has been achieved so far when taking account of the defined localization area. For the second aspect, the representation of a localization area may be obtained in this case before the first measurement results are obtained or before a complete first set of measurement results for the entire localization area is obtained.

In an example embodiment of either aspect, the localization area is defined to exclude zones of the site which are not accessible to the user for measurements by the mobile device. Such zones may not be accessible at all or have a restricted accessibility. It is to be understood that the localization areas may also be restricted based on other criteria. For example, separate localization areas may be used for indoor and outdoor survey, or separate localization areas may be used for different wings on the same floor of a large building, etc.

A user input defining a localization area may be enabled in various ways via any kind of user interface. The input as such may be enabled for instance by means of a touch sensitive screen of the mobile device or by means of keys and/or buttons of the mobile device in combination with a display of the mobile device that is not touch sensitive. The provided representation of the localization area may be of any form that facilitates its use. For example, the representation may be in the form of a set of values assigned to grid points or grid tiles of a grid. The grid may represent a geographical area comprising the localization area. The size of the grid may be set for example to a general size or adjusted for example to a respective site. The assigned values may depend on whether the grid tile or a zone associated with a grid point is to be considered to belong to the localization area or not. A zone associated with a grid point may be for example an area surrounding the grid point, e.g. in the form of a rectangle or a square, or it may be for example an area of which the grid point forms a predetermined one of its corners. Alternatively, for example, the localization area may be delimited by of one or more polygons and the provided representation may be in the form of vertices of the polygons.

An example embodiment of the first aspect comprises presenting a floor plan or image on a display of the mobile device, enabling a user of the mobile device to draw curves in the presented floor plan or image for marking zones that belong to the localization area, and detecting the drawn curves as the user input. Defining a localization area by drawing curves in a floor plan or image may be particularly convenient for a user and enable a fast definition. The curves drawn by the user may be visible or invisible on the display. By way of example, a representation of the localization area may be generated in this case by determining grid points of a grid lying within a predetermined distance to the curves, and by assigning a first value to the determined grid points of the grid and assigning a second value to remaining grid points of the grid.

An example embodiment of the first aspect comprises presenting a floor plan or image on a display of the mobile device, enabling a user of the mobile device to draw curves in the presented floor plan or image for marking zones that do not belong to the localization area, and detecting the drawn curves as the user input. Drawing curves in areas that are not to belong to the localization area may have the effect that the definition of the localization area may be performed faster and more easily by the user in most scenarios, since these areas may be smaller than the areas that are to belong to the localization area. By way of example, a representation of the localization area may be generated in this case by determining grid points of a grid lying within a predetermined distance to the curves, assigning a first value to the determined grid points of the grid and assigning a second value to remaining grid points of the grid.

With both alternatives, it would also be possible, for instance, to determine all grid tiles passed by the curve as belonging or not belonging to the localization area, and assigning a first value to a grid point associated with the grid tiles, and a second value to all other grid points. In all alternatives, the grid points may or may not be displayed on the display in addition to the floor plan or image. Furthermore, in all alternatives, all determined grid points, all zones associated with determined grid points or all determined grid tiles may or may not be colored or otherwise highlighted while the user draws curves for supporting the user in defining a complete localization area as intended.

Another example embodiment of the first aspect comprises presenting grid points of a grid on a display of the mobile device, enabling the user to select grid points of the grid which are associated with zones that belong to the localization area, and detecting the selected grid points as the user input. Enabling a user to select grid points may enable a particularly exact definition of localization area. A grid point may be selected in any desired manner, for instance by a tap or a double tap on a touch sensitive display. A selected grid point may or may not be highlighted for supporting the user. For example, all selected grid points may be presented in a changed color, with an increased size, or with a colored associated area, etc. By way of example, a representation of the localization area may be generated in this case by assigning a first value to selected grid points and a second value to non-selected grid points. A floor plan or image may or may not be presented to the user in addition on the display.

Another example embodiment of the first aspect comprises presenting grid points of a grid on a display of the mobile device, enabling the user to select grid points of the grid which are associated with zones that do not belong to the localization area, and detecting the selected grid points as the user input. Erasing grid points may be considered a special kind of selecting grid points. Erased grid points may be removed completely from the displayed grid, or they may be presented differently, for instance with reduced size or more lightly than the original presentation, or with a colored associated area, etc. Enabling a user to erase grid points may equally enable a particularly exact definition of localization area, and if the portions of the grid that are not to belong to the localization area are small compared to the portions that are to belong to the localization area, the definition of the localization area may be accelerated. By way of example, a representation of the localization area may be generated in this case by assigning a first value to selected grid points and a second value to non-selected grid points.

It is to be understood that in certain embodiments, grid points may also be selected by selecting associated zones.

It is to be understood that in all example embodiments assigning different values to grid points, one of the values may be assigned to all grid points by default so that assigning this value may simply mean keeping the default value.

Another example embodiment of the first aspect comprises presenting a grid on a display of the mobile device, enabling the user to select grid tiles of the grid which correspond to zones that belong to the localization area, and detecting the selected grid tiles as the user input. An alternative example embodiment of the first aspect comprises presenting a grid on a display of the mobile device, enabling the user to select grid tiles of the grid which correspond to zones that do not belong to the localization area, and detecting the selected grid tiles as the user input.

For the case polygons are to be used for delimiting the localization area, an example embodiment of the first aspect comprises enabling a user to define polygons on a display of the mobile device, the polygons representing a delimitation of zones that belong to the localization area, and detecting the definition of the polygons as the user input. Polygons may be represented in vector format. The user input may define a polygon for instance by drawing the polygon on the display, and the representation of the localization area may be generated by determining local or global coordinates of the vertices of the polygons. Alternatively, the user input may indicate the vertices of the polygons on the display and the representation of the localization area may be generated by determining local or global coordinates the vertices. Further alternatively, the user input may comprise the pressing of a button when located at locations corresponding to each one of the vertices, and the representation of the localization area may be generated in this case by determining global coordinates of the vertices based on coordinates provided by an assisted global navigation satellite system based positioning supported by the mobile device at east of the locations.

A variation enables a user to define polygons on a display of the mobile device based on polygons defining a floor plan that are presented on the display. This may render the input more convenient to the user.

In a further variation, a user may be enabled to define polygons on a display of the mobile device, which represent a delimitation of zones that do not belong to the localization area, and the definition of these polygons may be detected as the user input. It is to be understood that also in this case, a user may be enabled to define polygons on a display of the mobile device based on polygons defining a floor plan presented on the display.

An example embodiment of the first aspect may equally comprise generating a radio map based on the obtained fingerprints, that is, based on the measurement results and the indications of the locations. An example embodiment of the first aspect and/or of the second aspect may equally comprise using the provided representation of the localization area in connection with a generated radio map. A representation of the localization area may be used in connection with a radio map in many ways; it may be used for example to support a generation of the radio map and/or to support an evaluation of a generated radio map and/or to support a use of a generated radio map in positioning operations.

An example embodiment of the first aspect and/or of the second aspect comprises determining a degree of coverage of the radio map within the localization area only. This may be considered supporting an evaluation of a generated radio map using the representation of the localization area. Optionally, a request for additional measurements in the localization area may be caused in this embodiment, in case the determined degree of coverage falls short of a predetermined value. This may be considered in addition supporting a generation of a radio map using the representation of the localization area. Further optionally, an indication of the degree of coverage may be caused to be stored for further use.

Alternatively or in addition, an example embodiment of the first aspect and/or of the second aspect comprises determining at least one indication of quality of the radio map in the localization area. This may be considered supporting an evaluation of a generated radio map using the representation of the localization area. Optionally, a request for additional measurements in the localization area may be caused in this embodiment, in case at least one of the at least one indication of quality falls short of a predetermined value. This may be considered in addition supporting a generation of a radio map using the representation of the localization area. Further optionally, the at least one indication of quality may be caused to be stored for further use, for instance as information on a quality of a positioning that is performed based on the radio map.

Alternatively or in addition, an example embodiment of the first aspect and/or of the second aspect comprises determining a position of a mobile device based on the radio map, while limiting possible positions of the mobile device to the localization area. This may be considered supporting a use of a generated radio map using the representation of the localization area.

In an example embodiment of the first aspect and/or of the second aspect, the localization area is represented by grid points of a grid having an assigned predetermined value, the grid points associated with zones that are to be covered by the radio map and/or by grid points of a grid having an assigned predetermined value, the grid points associated with zones that are not to be covered by the radio map and/or grid tiles of a grid which correspond to zones that are to be covered by the radio map and/or grid tiles of a grid which correspond to zones that are not to be covered by the radio map and/or by polygons delimiting zones that are to be covered by the radio map and/or by polygons delimiting zones that are not to be covered by the radio map and/or by vertices defining polygons delimiting zones that are to be covered by the radio map and/or by vertices defining polygons delimiting zones that are not to be covered by the radio map. Different values assigned to grid points of a grid may be provided for example in the form of a binary matrix.

In an example embodiment, the at least one transmitter comprises at least one terrestrial transmitter, since satellite signals may be less suited for indoor positioning. In an example embodiment, the at least one transmitter comprises at least one non-cellular terrestrial transmitter. The at least one non-cellular terrestrial transmitter may comprise any non-cellular ground based transmitter that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter may optionally be a part of a respective transceiver. WLAN and Bluetooth transmitters are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters may thus have the effect that the supported positioning may be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved. It is to be understood that the at least one transmitter may also comprise at least one cellular transmitter, like a base station of a cellular communication network. However, due to the narrow frequency bands of cellular signals, WLAN and Bluetooth nodes may generally enable a more accurate positioning. Furthermore, transmitters transmitting any other kind of wireless signals, including for instance ultra-wideband (UWB) signals or any wireless signals that might emerge in the future, may be used as well. The transmitters do not even have to be ground-based necessarily. For example, the transmitters may also comprise communication nodes in a ship.

In an example embodiment of the first aspect and/or of the second aspect, the characteristics of signals comprise a value relating to a received signal strength of a signal from a respective transmitter at the mobile device and an identifier of the respective transmitter.

If the transmitter is a WLAN access point, for example, the results of the measurements may contain for instance a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.). If the transmitter is a transmitter of a cellular communication network, for example, the results of the measurements may contain for instance a global and/or local identification of the cellular network cells observed, their signal strengths and/or path losses and/or timing measurements like timing advance (TA) or round-trip time. If the transmitter is of a further type, the results of the measurements may contain for example similar data.

Figure 4:
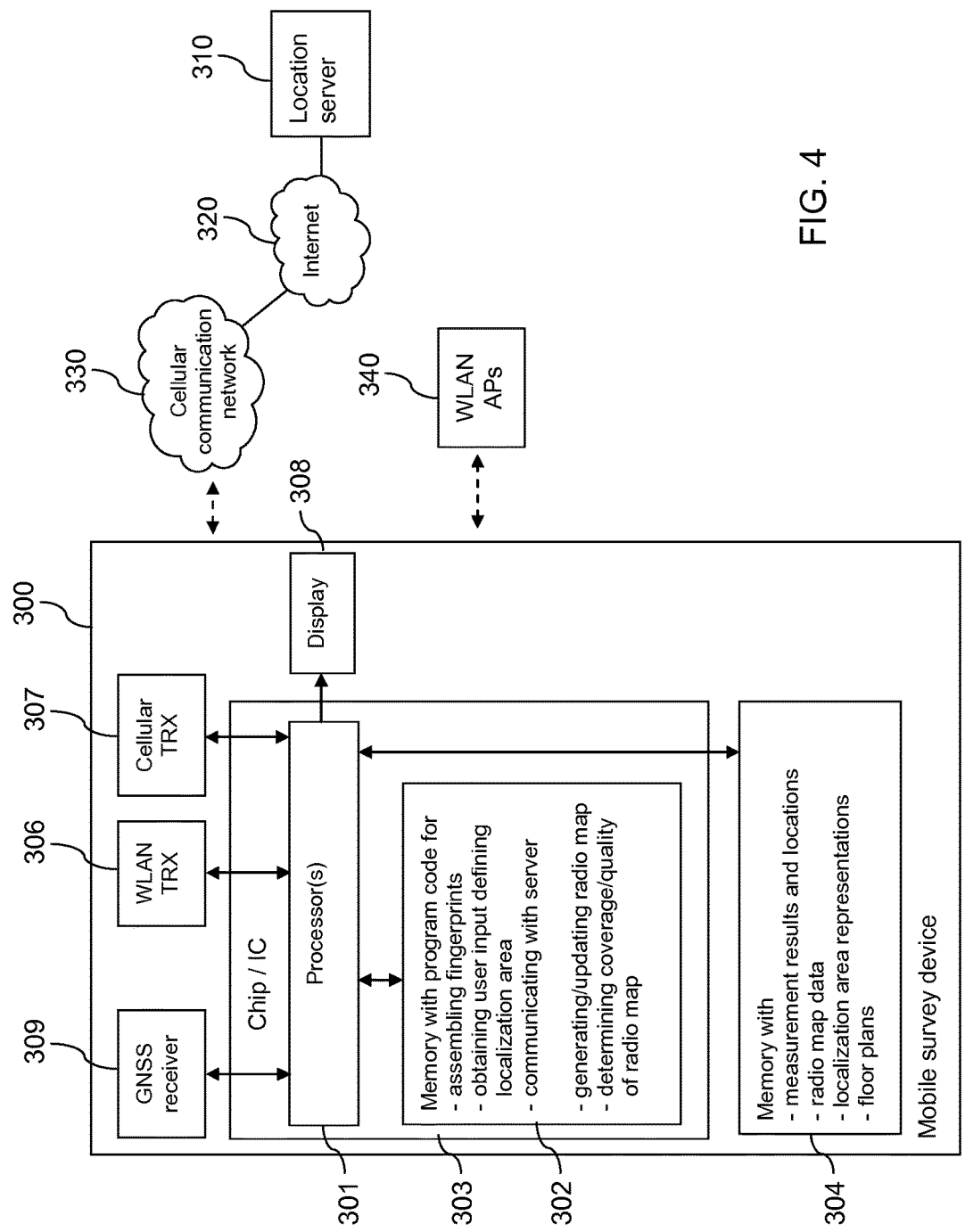
FIG. 4 is a first schematic block diagram of an example embodiment of a system.

FIG. 4 is a schematic block diagram of an example embodiment of a system supporting the use of radio maps according to both aspects of the invention.

The system comprises a mobile survey device 300 and a location server 310. The system further comprises a network 320, by way of example the Internet. The system further comprises a cellular communication network 330 that is connected to the Internet 320. The system further comprises a number of WLAN access points (AP) 340.

Mobile survey device 300 may be for instance a regular mobile terminal, like a smartphone or general purpose tablet PC, or a dedicated survey device. Mobile survey device 300 comprises a processor 301 that is linked to a first memory 302, to a second memory 304, to at least one GNSS receiver 309, to a WLAN component 306, to a cellular communication component 307 and to a display 308.

Processor 301 is configured to execute computer program code, including computer program code stored in memory 302, in order to cause mobile survey device 300 to perform desired actions.

Memory 302 stores computer program code for assembling fingerprints, computer program code for detecting a user input defining a localization area and computer program code for communicating with server 310. Some of the program code in memory 302 may be similar to program code according to the first aspect in memory 102. In addition, memory 302 may store computer program code configured to realize other functions, for instance computer program code for generating and updating radio maps, computer program code for determining a coverage and/or quality of generated radio maps, etc. In addition, memory 302 may also store other kind of data.

Processor 301 and memory 302 may optionally belong to a chip or an integrated circuit 303, which may comprise in addition various other components, for instance a further processor or memory.

Memory 304 is configured to store data, including for example results of measurements and locations of measurement, data of generated radio maps, representations of localization areas and floor plans. It may be configured to store any other desired data as well.

WLAN component 306 includes at least a WLAN transceiver (TRX). WLAN component 306 enables mobile survey device 300 to perform radio measurements on radio signals that are broadcast by WLAN access points 340. In addition, it may enable mobile device 300 to establish a connection with WLAN access points 340 for accessing the associated WLAN. It is to be understood that any computer program code based processing required for a WLAN communication may be stored in an own memory of WLAN component 306 and executed by an own processor of WLAN component 306, or it may be stored for example in memory 302 and executed for example by processor 301.

Cellular communication component 307 includes at least a cellular transceiver. It enables mobile survey device 300 to communicate with other entities via cellular communication network 330. It may be a cellular engine that is configured to take care of all processing required for a cellular communication. Alternatively, at least some of the processing that is required for a cellular communication may be realized by processor 301 executing corresponding additional program code stored in memory 302.

Display 308 may be a touchscreen, as an exemplary user interface.

The at least one GNSS receiver 309 may comprise any kind of global navigation satellite signal receiver, for example a GPS receiver and/or a GLONASS receiver and/or a GALILEO receiver. It may be configured to receive corresponding satellite signals and to determine the current position of mobile survey device 300 based on the signals, possibly using assistance data.

It is to be understood that mobile survey device 300 may comprise various other components.

Component 303 or mobile survey device 300 may be an example embodiment of an apparatus according to the first aspect of the invention.

Location server 310 is a server that is configured to receive fingerprints from various mobile survey devices via the Internet 320, to generate assistance data for a WLAN based positioning based on the received fingerprints, and to use the assistance data for positon computations upon request.

Cellular communication network 330 may be any kind of cellular communication network, like a Global System for Mobile Communications (GSM), a CDMA2000, a Universal Mobile Telecommunications System (UMTS), or a long term evolution (LTE) based communication network.

The WLAN access points (AP) 340 may be access points of one or more WLANs. The WLAN or WLANs may but do not have to be connected to the Internet 320.

Figure 5:
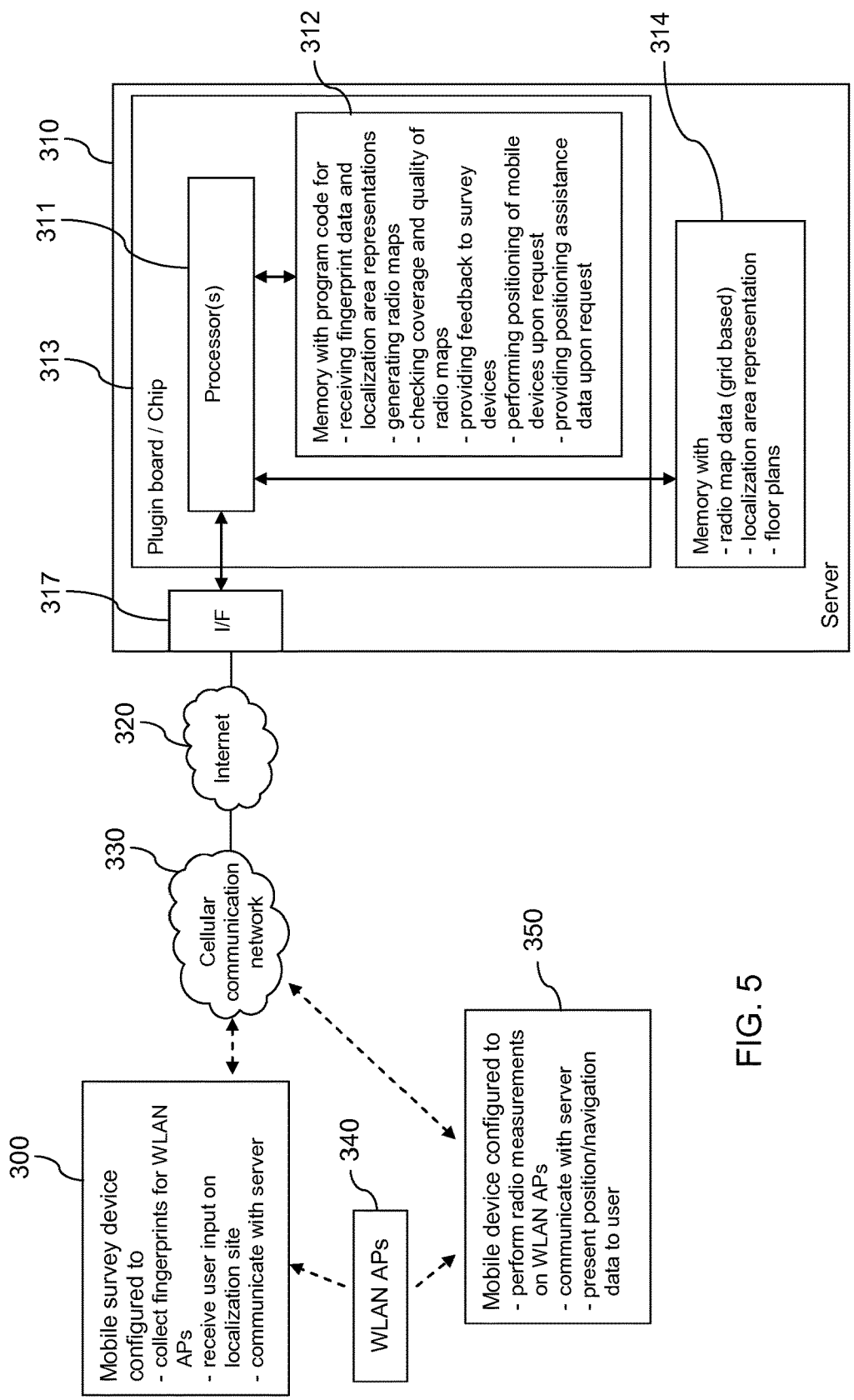
FIG. 5 is a second schematic block diagram of the example embodiment of a system.

FIG. 5 is a further schematic block diagram of the example embodiment of the system of FIG. 4.

The system comprises again mobile survey device 300, location server 310, Internet 320, cellular communication network 330 and WLAN access points 340. In addition, a further mobile device 350 is shown as a part of the system.

In FIG. 5, server 310 is illustrated in more detail.

Server 310 comprises a processor 311 that is linked to a first memory 312, to a second memory 314 and to an interface (I/F) 317.

Processor 311 is configured to execute computer program code, including computer program code stored in memory 312, in order to cause server 310 to perform desired actions.

Memory 312 stores computer program code for receiving fingerprint data and localization area representations from mobile survey devices, computer program code for generating radio maps based on received fingerprint data as positioning assistance data, computer program code for checking coverage and quality of generated radio maps, computer program code for providing feedback to mobile survey devices, and computer program code for performing a positioning of mobile devices upon request taking account of localization areas. Some of the program code in memory 302 may be similar to program code according to the second aspect in memory 102. In addition, memory 312 may store computer program code configured to realize other functions, like computer program code for providing positioning assistance data to requesting mobile devices. In addition, memory 312 may also store other kind of data.

Processor 311 and memory 312 may optionally belong to a plug-in board or a chip with an integrated circuit 313, which may comprise in addition various other components, for instance a further processor or memory.

Memory 314 is configured to store data, including for example data of generated radio maps and received localization area representations and floor plan data. In addition, it may store other data, including for example received fingerprint data and/or data of computed parametric radio models.

It is to be understood that the data of memory 314 may also be distributed to several memories, which may be partly or completely external to server 310. For example, radio map data that has to be checked may be stored along with localization area representations internal to server 310 and final radio map data or data of parametric radio models may be stored along with a copy of localization area representations at an external memory that is accessible via another server.

Interface 317 is a component which enables server 310 to communicate with other devices, like mobile device 300 and 350, via networks 320 and 330. It may also enable server 310 to communicate with other entities, like other servers. Interface 317 may comprise for instance a TCP/IP socket.

It is to be understood that server 310 may comprise various other components.

Component 313 or server 310 may be an example embodiment of an apparatus according to the second aspect of the invention.

Mobile device 350 may be for instance a mobile terminal, like a regular smartphone or tablet computer. It is configured to perform measurements on WLAN APs, to request server 310 to compute and provide the position of mobile device 350 based on results of the measurements, and to present information that is based on computed and received position information to a user.

Example operations in the system of FIGS. 4 and 5 will now be described with reference to FIGS. 6 to 11. All communications between mobile survey device 300 and server 310 may take place for instance via cellular communication network 330 and the Internet 320.

Figure 6:
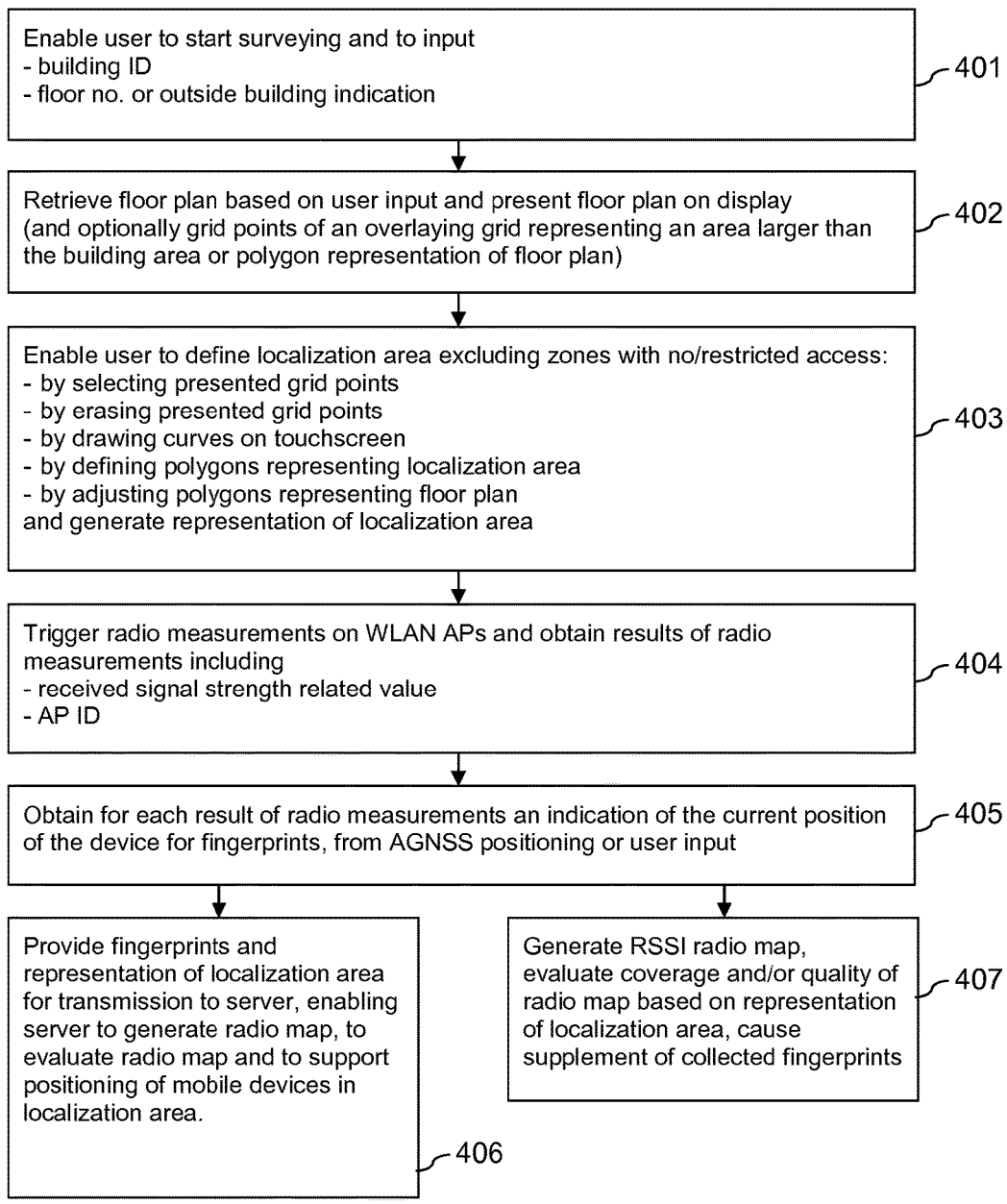
FIG. 6 is a flow chart illustrating an example embodiment of operations in the system of FIGS. 4 and 5.

FIG. 6 is a flow chart illustrating example operations at mobile survey device 300.

Processor 301 and some of the program code stored in memory 302 may cause mobile survey device 300 to perform the presented actions when the program code is retrieved from memory 302 and executed by processor 301.

A collecting agent, as an exemplary user, may be requested to collect fingerprints at a particular site, for instance separately on all floors and in the outdoor area of a particular building. The collecting agent may activate a corresponding application at mobile survey device 300, which requests him to input at first a building identifier (ID) and the floor number or an outdoor indication. (action 401) It is to be understood that the values may also be offered to the user for selection from a list provided by server 310 using e.g. a connection that is automatically established when activating the application.

Based on the input of the collecting agent, mobile survey device 300 may now retrieve a floor plan for the identified building and the indicated floor and present the floor plan on display 308. (action 402) The floor plan may be one of a plurality of floor plans previously stored in mobile survey device 300, or it may be downloaded from server 310. The first approach makes mobile survey device 300 independent from a connection to server 310. The second approach may save storage space in mobile survey device 300. Optionally, grid points of a grid overlaying the floorplan may be presented on display 308. The grid may represent an area that is somewhat larger than the outline of the actual building. A presentation of a floor plan of an example second floor of an example building A with an example overlaying grid is illustrated in FIG. 7a. Alternatively, the floor plan may optionally be defined by polygons.

Mobile survey device 300 enables the collecting agent in addition to define a localization area in which measurements are to be taken as a basis for a particular radio map. (action 403) This localization area may be, for instance, an area that is limited to a particular floor inside of the building and that excludes areas that are not accessible or that are not accessible to the public, or it may be limited to an outdoor area surrounding the building as far as publicly accessible. In addition, a representation of the localization area that is suitable for processing may be generated based on the input of the collecting agent. The representation of the localization area may be stored in memory 304.

The collecting agent may be enabled to define the localization area for instance by selecting presented grid points of a binary grid representing a particular floor to indicate zones that are to be included in the localization area, as illustrated in FIGS. 7a to 7e.

In the example of FIG. 7a, which has already been referred to, for instance, the collecting agent may select all grid points within the outline of the second floor of building A. A value of "0" may be assigned by default to all grid points, and a value of "1" may be assigned to all selected grid points.

Alternatively, a user may be enabled to define the localization area for instance by erasing presented grid points of a grid to indicate zones that are not to be included in the localization area. In the example of FIG. 7a, for instance, the collecting agent may erase all grid points outside the outline of the second floor of building A.

Alternatively, a user may be enabled to draw a curve in those zones of the floor plan that are to be included in the localization area. This is illustrated in FIG. 7b, which shows again the floor plan of the second floor of building A, and an example drawn curve. The drawn curve may be visible or invisible on display 308. Mobile survey device 300 may then determine all grid points that lie within a predetermined distance to the curve. Such determined grid points are indicated in FIG. 7b for the example drawn curve. A value of "0" may be assigned by default to all grid points, and a value of "1" may be assigned to all grid points that are determined to lie within a predetermined distance to the curve. If desired, the grid points that are determined or associated zones may be highlighted in some way on display 308 for supporting the user in defining the localization area.

In each case, the grid values may be assembled in the form of a matrix as a representation of the localization area. The building identifier, the floor number or outdoor indicator and optionally a geographical reference may be associated with the matrix. The geographical reference may be for instance a local reference fixing the position of the grid relative to the floor plan, or it may comprise geographical coordinates, for instance a North/East coordinate pair corresponding to the upper left grid point of the grid.

Example of sets of grid points that are finally to define localization areas of building A are illustrated in FIGS. 7c-e, each showing a floor plan and grid points that define an example localization area, e.g. by having an assigned value of "1". Building A is assumed to comprise a first floor, a second floor and an outdoor area on the same level as the first floor. It can be seen that in FIG. 7c, the localization area is limited to the area of the first floor within the building and that it excludes a restricted area. In FIG. 7d, the localization area is limited to the area of the second floor within the building. In FIG. 7e, the localization area is limited to an outdoor area surrounding the building.

Figure 8A:
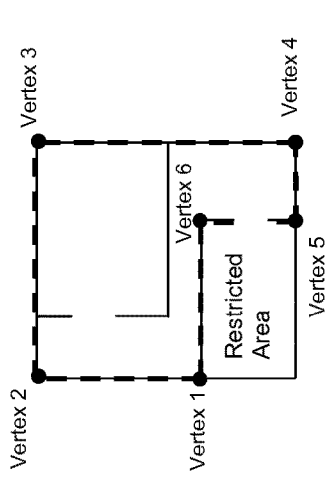
FIG. 8*a-d* are diagrams illustrating example details of the operations of FIG. 5.

Further alternatively, the collecting agent may be enabled to define one or more polygons delimiting the localization area that is to be covered by a respective radio map, as illustrated in FIGS. 8a to 8d. In these figures, polygons are indicated with bold, dashed lines. Each polygon may be defined as a set of consecutive polygon vertices, where each vertex may be defined as a pair of local or global coordinates, like a longitude/latitude value pair. FIG. 8a illustrates a set of vertices 1 to 6 defining an exemplary polygon that may represent the localization area for the first floor of building A. A set of vertices defining a polygon or a plurality of sets of vertices defining polygons may be an example representation of a localization area, which may be provided along with the building identifier and the floor identifier or outdoor indication.

Figure 8D:
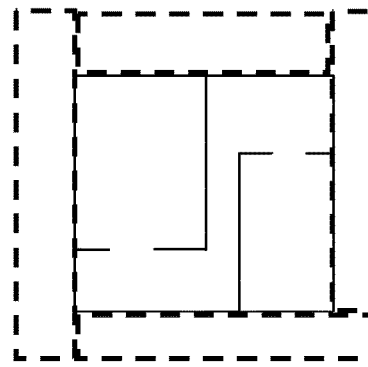
Figure 8C:
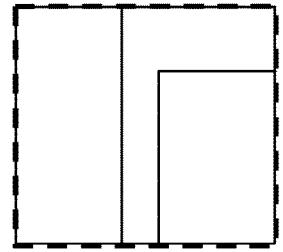
Figure 8B:
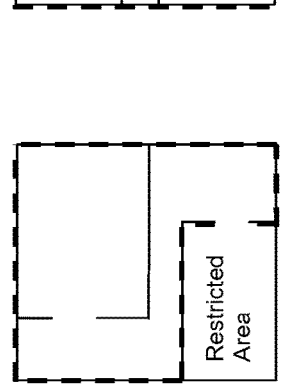

Example polygons that define localization areas of building A are illustrated in FIGS. 8b-d. Building A is assumed again to comprise a first floor, a second floor and an outdoor area. It can be seen that in FIG. 8b, the localization area is limited to the area of the first floor within the building and that it excludes a restricted area. In FIG. 8c, the localization area is limited to the entire area of the second floor within the building. In FIG. 8d, the localization area is limited to an outdoor area surrounding the building. In this latter case, four separate polygons are used by way of example for representing the localization area, but it is to be understood that the same localization area may also be represented for instance by a set of two polygons.

In order to facilitate the definition of polygons to the collecting agent, an initial localization area may be defined as a set of polygons which cover a presented floor plan or floor image. In this case, the collecting agent only needs to modify the polygons that do not match the actual localization area.

Furthermore, WLAN component 306 may be activated automatically by the application. WLAN component 306 detects radio signals from WLAN access points 340 in the environment and performs radio measurements at regular intervals. The results of the measurements may contain for example a basic service set identification (BSSID), like the medium access control (MAC) address of observed access points (APs), the service set identifier (SSID) of the access points, and a received signal strength related value. (action 404)

In addition, an indication of the current position of the device is obtained for each location at which measurements are performed. (action 405) The collecting agent may be required for example to enter information on a respective measurement location, for instance based on a map that guides him through the building. Alternatively, GNSS receiver 309 may be activated automatically as well by the application. GNSS receiver 309 may capture satellite signals and estimate the position of mobile survey device 300 at the same regular intervals in which measurements are performed, for example once per second. Since the satellite signals may be difficult to receive in the building, the positioning may be an assisted GNSS (AGNSS) based positioning assisted by assistance data that is provided by some GNSS assistance server via cellular communication network 330 and received at mobile survey device 300 by means of cellular communication component 307. The indicated position may have at least a horizontal component, for instance a longitude value and a latitude value, or easting and northing values.

The collecting agent may move slowly through the localization area guided by floor plan and by the grid with the aim to pass through each of the grid tiles of the grid, as far as accessible, at least once. In the case of a GNSS based positioning, an indication of the respective position of the collecting agent may be indicated on the map as well as further guidance. Alternatively, the collecting agent may try to uniformly pass through all parts of the area on his own.

Mobile survey device 300 assembles fingerprints, each fingerprint comprising a location that has been determined during the survey at a particular time and results of measurements for one or more WLAN access points 340 that have been obtained basically at the same time. The collected fingerprints may be stored in memory 304.

Generating a representation of a localization area in action 403 before a set of fingerprints has been assembled in actions 404 and 405 may have the effect that the localization site may be indicated to the collecting agent on the display as well while fingerprints are being collected. The definition of localization areas may also be performed by the collecting agent for the entire building before fingerprints are collected separately in each localization area. The collecting agent may be enabled to go through a list of floor levels presented on display 308 and define localization areas which are meant for localization on a respective floor or in an outdoor area. Further alternatively, the definition of the localization area may also be performed by the collecting agent for the entire building after fingerprints have been collected separately in each localization area.

It is to be understood, however, that action 403 may be performed at any time before actions 406 and 407. Generating a representation of a localization area in action 403 after a set of fingerprints has been assembled in actions 404 and 405, for example, may have the effect that the collecting agent may get an overview over the appropriate localization area while the measurements are being carried out.

In the approach of FIG. 6, mobile survey device 300 may now provide the assembled fingerprints for an identified floor or outdoor area of the identified building together with the representation of the defined localization area for transmission to server 310. (action 406) The data enables server 310 to generate a radio map, to evaluate the radio map and to support a positing of mobile devices in the localization area.

It is to be understood that the representation of the localization area may also be provided for transmission separately from the fingerprints, in particular, though neither necessarily nor exclusively, when the localization areas are defined for the entire building in a way decoupled from the collection of measurements in the respective localization area.

Alternatively or in addition to providing the data for transmission to server 310, mobile survey device 300 may generate a received signal strength radio map, evaluate coverage and/or other quality of the radio map based on the represented localization area, and if necessary request the collecting agent to supplement the fingerprint collection. (action 407) Example details of such operations may be the same or similar as described further below for server 310 with reference to actions 413 to 419 of FIG. 9. If mobile survey device 300, which collects fingerprints and detects user definitions of localization areas, is also configured to generate and evaluate a radio map, this may have the effect that it is enabled to collect fingerprints for a high quality radio map independently from any server feedback. This means that mobile device 300 does not necessarily have to rely on a connectivity to a server—for example via a cellular communication network—at any location at which information on the sufficiency of collected fingerprints may be desired. In this case, fingerprint data or radio map data may be provided to server 310, for example, only after it has been ensured that the data is satisfactory for positioning purposes.

Figure 9:
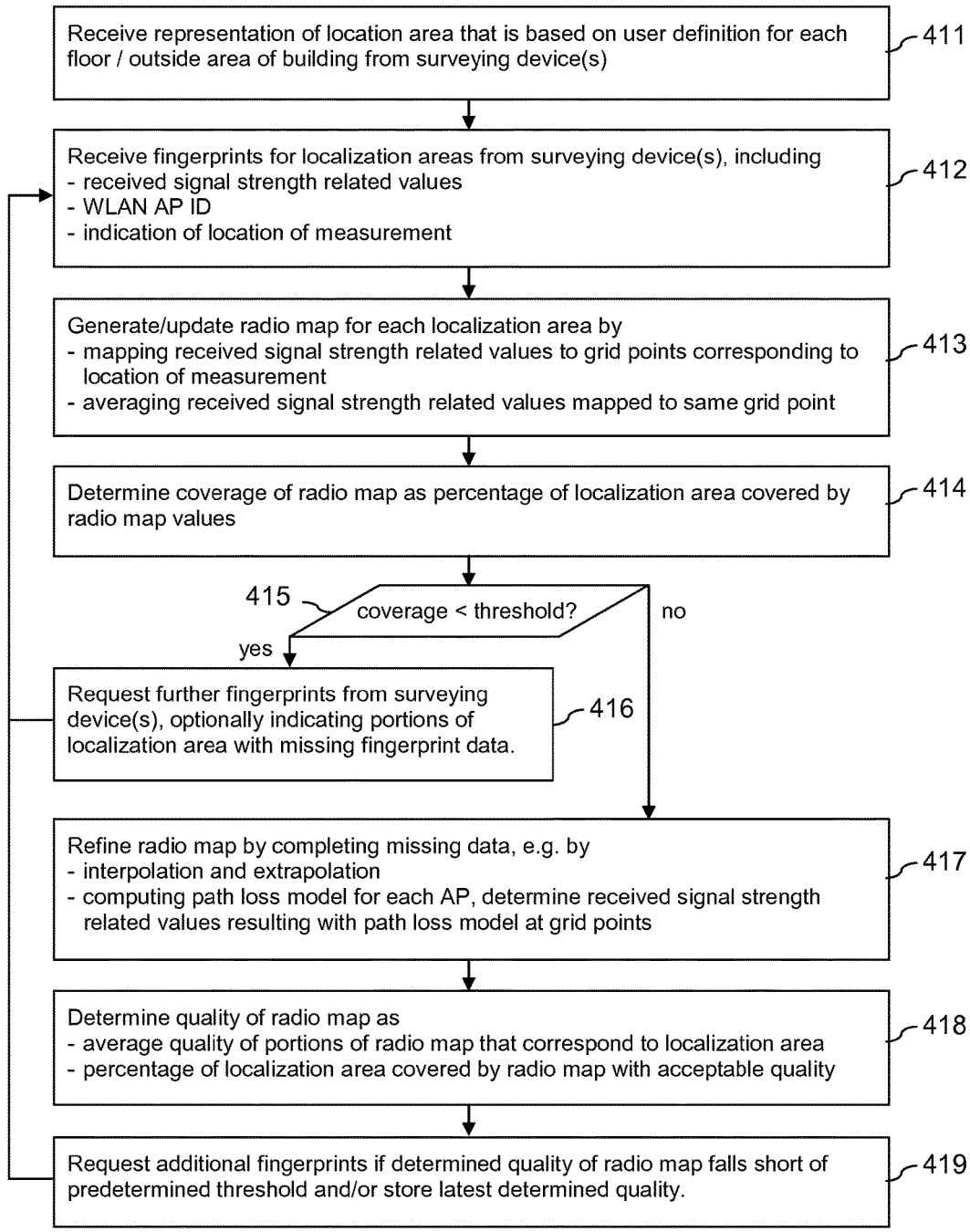
FIG. 9 is a flow chart illustrating an example embodiment of further operations in the system of FIGS. 4 and 5.

FIG. 9 is a flow chart illustrating first example operations at server 310. These example operations enable the generation of high quality radio maps for supporting a positioning of mobile devices.

Processor 311 and some of the program code stored in memory 312 may cause server 310 to perform the presented actions when the program code is retrieved from memory 312 and executed by processor 311.

Sever 310 receives from mobile survey device 300 and/or from some other mobile survey device a representation of a localization area for each floor and outdoor area of a building. The representation of each localization area is based on a user definition and received along with a building identifier and a floor identifier or an outdoor indication. (action 411) Any received representation of a localization area may be stored in memory 314. If a single collecting agent using mobile survey device 300 is responsible for surveying an entire building, mobile survey device 300 may transmit a representation of all localization areas for this building (or even for several buildings) together. Alternatively, a representation of each localization area may be transmitted separately. This may have the effect that a collecting agent may receive a feedback that is based on the representation of a localization area, as described further below, while surveying this localization area at the building. It is to be understood that several collecting agents may be responsible for surveying different localization areas of a building using different mobile survey devices. In this case, each collecting agent may define any localization area that is surveyed by the respective collecting agent. Alternatively, a particular collecting agent may be responsible for defining all localization areas of the building. It would also be possible that several mobile survey devices are used for surveying a single localization area of a building. In this case, one of the collecting agents may be responsible for defining the localization area.

Sever 310 moreover receives from mobile survey device 300 and/or from other mobile survey devices a set of fingerprints for one or more localization areas at a building. (action 412) Each fingerprint comprises the signal strength of WLAN signals detected by the mobile survey device 300 at a particular location, like RSSI values, an identifier of the WLAN access points (WLAN AP ID) 340 that transmitted these signals and an indication of the location of measurement. The fingerprint data may be stored in memory 314. Each received set of fingerprints may be accompanied by the building identifier and a floor number or outdoor indicator to specify the relevant localization area. It is to be understood that if a set of fingerprints is received along with a representation of the relevant localization area, the relevant localization area only has to be specified once.

Server 310 may now generate a radio map for each localization area based on the set of fingerprints obtained for the localization area. (action 413) Server 310 defines a grid with grid points corresponding to geographical locations in the localization area such that the grid covers at least the localization area. The grid may be of predetermined size or be adjusted to the size of the currently considered building. Server 310 then maps each received signal strength related value from a fingerprint along with the associated WLAN access point identifier to the grid point of the grid that corresponds to a geographical location that is closest to the location of measurement of the received signal strength related values. This process is performed for each fingerprint from the set of fingerprints obtained for a particular localization area. If several received signal strength related values associated in several fingerprints with the same WLAN access point would have to be mapped to the same grid point, the received signal strength related values associated with this access point may be averaged and the average value may be mapped to the grid point, possible with an indication of the number of values that resulted in the average value.

Server 310 may now determine the degree of coverage of the generated radio map based on the representation of the localization area for which the radio map was generated. (action 414) The degree of coverage may be calculated for example as the percentage of the localization area for which received signal strength related values are available, that is, for the percentage of grid points of the radio map that correspond to a location within the localization area and to which received signal strength related values have been mapped compared to all grid points of the radio map that correspond to a location within the localization area.

If the degree of coverage falls short of a predetermined threshold, server 310 may generate and transmit a request for further fingerprints to mobile survey device 300—and/or to any other mobile survey device that was responsible for the particular localization area. (actions 415, 416) Optionally, server 310 may indicate to mobile survey device 300 those portions of the localization area with missing fingerprint data in order to enable a more targeted collection of further fingerprints.

Server 310 may continue with actions 412 to 415 until a desired degree of coverage is achieved or e.g. until a maximum number of iterations has been carried out or e.g. until the collecting agent indicates via mobile survey device 300 to server 310 that a further collection of fingerprints is considered not to provide any further improvement. Action 413 may comprise in these iterations an update of the existing radio map instead of a new generation of a radio map. However, a new generation would also be possible, if the previously received fingerprint data was stored in memory 314.

Once server 310 has determined in action 415 that the degree of coverage exceeds the predetermined threshold, server 310 may further refine the radio map by completing data for those grid points corresponding to locations within the localization area to which still no received signal strength related values have been mapped. (action 417) The refinement may be carried out in any desired manner. Server 310 may, for example, interpolate values as far as possible, and extrapolate all other values. Alternatively, server 310 may compute a path-loss model for each WLAN access point based on the radio map data, and determine the received signal strength related values that would result according to the path-loss model at each grid point, or at each grid point for which measurement values are missing.

Server 310 may now determine the quality of the resulting map. (action 418) The quality may be determined for example as the average quality of those portions of the radio map that corresponds to the localization area. Alternatively or in addition, the quality may be determined for example as the percentage of the localization area that is covered by radio map with acceptable quality.

While the coverage of the radio map may be considered an indication of quality, any other kind of quality may be determined in action 418, for instance a positioning quality that may be achieved with the radio map. For example, every nth fingerprint received from a mobile survey device (with n being a natural number greater 2) may be omitted in generating the radio map in action 413. The measurement results from each of these omitted fingerprints may now be used for estimating the position of mobile survey device 300 at the time of measurement, and the estimated position may then be compared to the location of measurement indicated in the fingerprint as an indication of quality of the radio map for the location of measurement. An indication of quality may be determined for each of a plurality of subareas, for instance for each grid area corresponding to an area in the localization area. A quality of a subareas may be classified e.g. as poor, if the average of the horizontal error in the subarea exceeds a threshold (e.g. 10 m or any other value) or if no test fingerprints are available for the area, and e.g. as acceptable, if the average of the horizontal error in the subarea falls short of this threshold. The result for all subareas within the localization area allows determining the percentage of subareas within the localization area with acceptable quality as a first indication of quality. Alternatively or in addition, the average quality for the entire localization area may be determined as a second indication of quality by determining an average horizontal error for all test fingerprints.

In case at least one of the determined indications of quality falls short of a further predetermined threshold, server 310 equally requests mobile survey device 300—or any other mobile survey device—to provide additional fingerprints from the localization area. (action 419) Server 310 may then continue with action 412 until a desired quality is achieved or e.g. until a maximum number of iterations has been carried out or e.g. until the collecting agent indicates via mobile survey device 300 to server 310 that a further collection of fingerprints is considered not to provide any further improvement. Alternatively or in addition, server 310 may store the latest determined quality.

If mobile survey device 300 is configured to generate and evaluate the radio map in line with actions 413 to 419, as indicated with reference to action 407, server 310 may or may not be configured to carry out these actions. If server 310 is configured to generate and evaluate the radio map, this may have the effect that the collecting mobile devices require less processing resources.

In any case, modeling the WLAN environment from received signal strength measurements as two-dimensional radio maps allows capturing the dynamics of the indoor radio propagation environment in a compressible and highly accurate way, and allows achieving a high horizontal positioning accuracy with WLAN access point signals within the coverage of the created radio maps, as long as the radio maps have a high quality, which may be achieved with the presented approach of supplementing a collection of fingerprints until high quality radio maps may be obtained. In addition, a reliable floor detection may be enabled on the basis of such radio maps.

In example embodiments, it would also be possible to continuously present to the collecting agent the floor plan, an indication of the localization area and an indication of the progressing quality of a radio map for sub-areas of the localization area. This may be achieved by continuously determining the coverage and/or quality for sub-areas after a respective fingerprint or a respective predetermined number of fingerprints has been collected.

Figure 10:
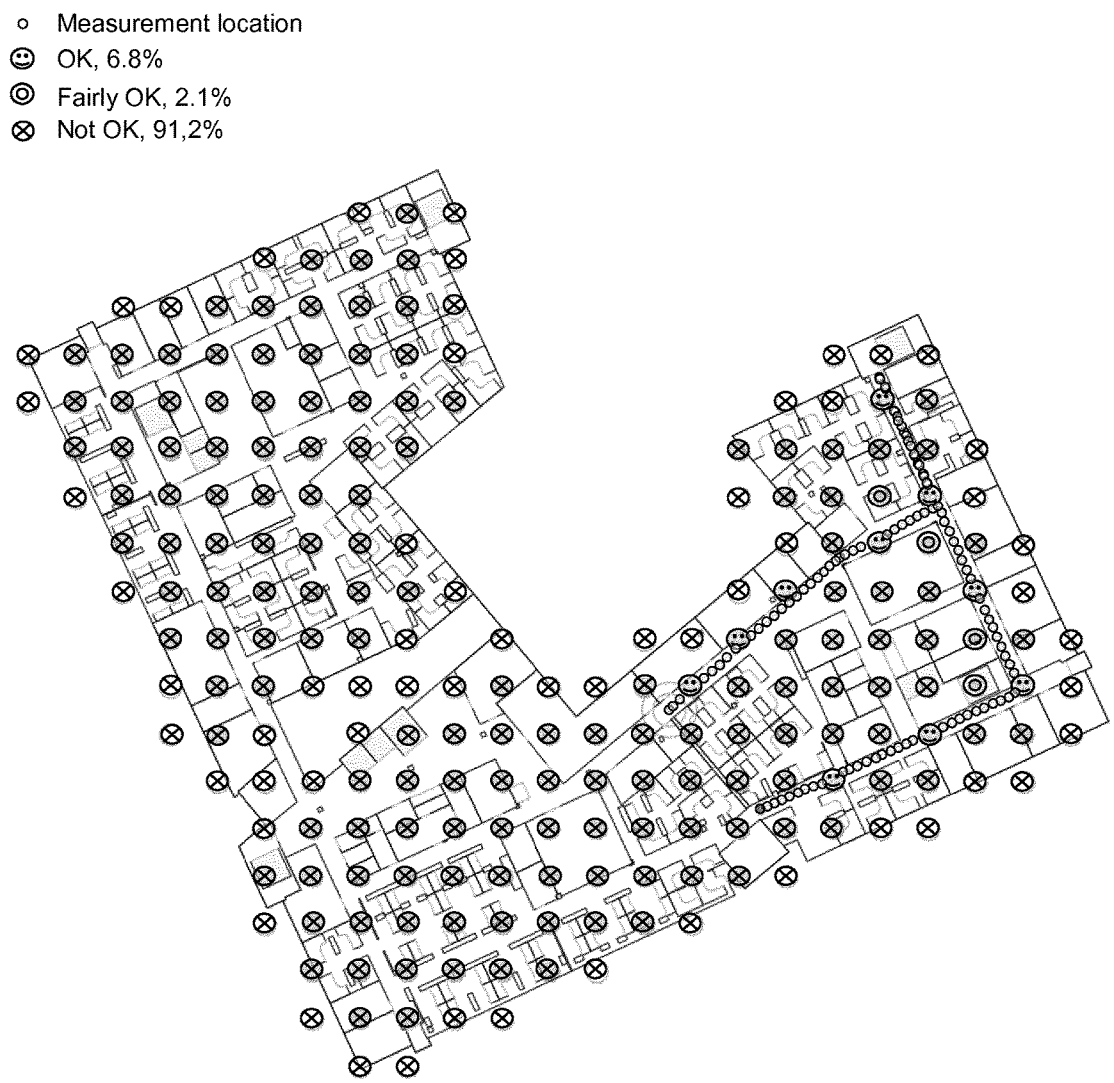
FIG. 10 is a diagram illustrating an example presentation on a display of a mobile device.

FIG. 10 is a diagram illustrating an example presentation on display 308. The presentation includes a floor plan indicated with solid lines. Different areas on the floor that belong to a user defined localization area are represented by larger circles. Different designs of these circles indicate a good quality, a sufficient quality and a poor quality, respectively. The sub-areas with high quality are sub-areas that have already been passed by the collecting agent, in the presented example while moving along a corridor. This movement is indicated with smaller circles representing e.g. measurement locations along the path. A collecting agent may thus concentrate on the sub-areas with poor quality and belonging to the defined localization area during the further survey. It is to be understood that in practice, the indications could be provided by colors for an easy comprehension, e.g. green for good quality, yellow for sufficient quality and red for poor quality. In some embodiments, the collecting agent may also be enabled to zoom in a selected portion of the floor plan to see sub-areas and an associated quality indication with a finer resolution. The determination of the quality may be performed for instance either at mobile survey device 300 in the scope of action 407 or at server 310 in the scope of action 416. It is to be understood that in this case, coverage and other quality indications may optionally be determined at the same time, and they may be determined and provided per sub-area for indication to a user.

Figure 11:
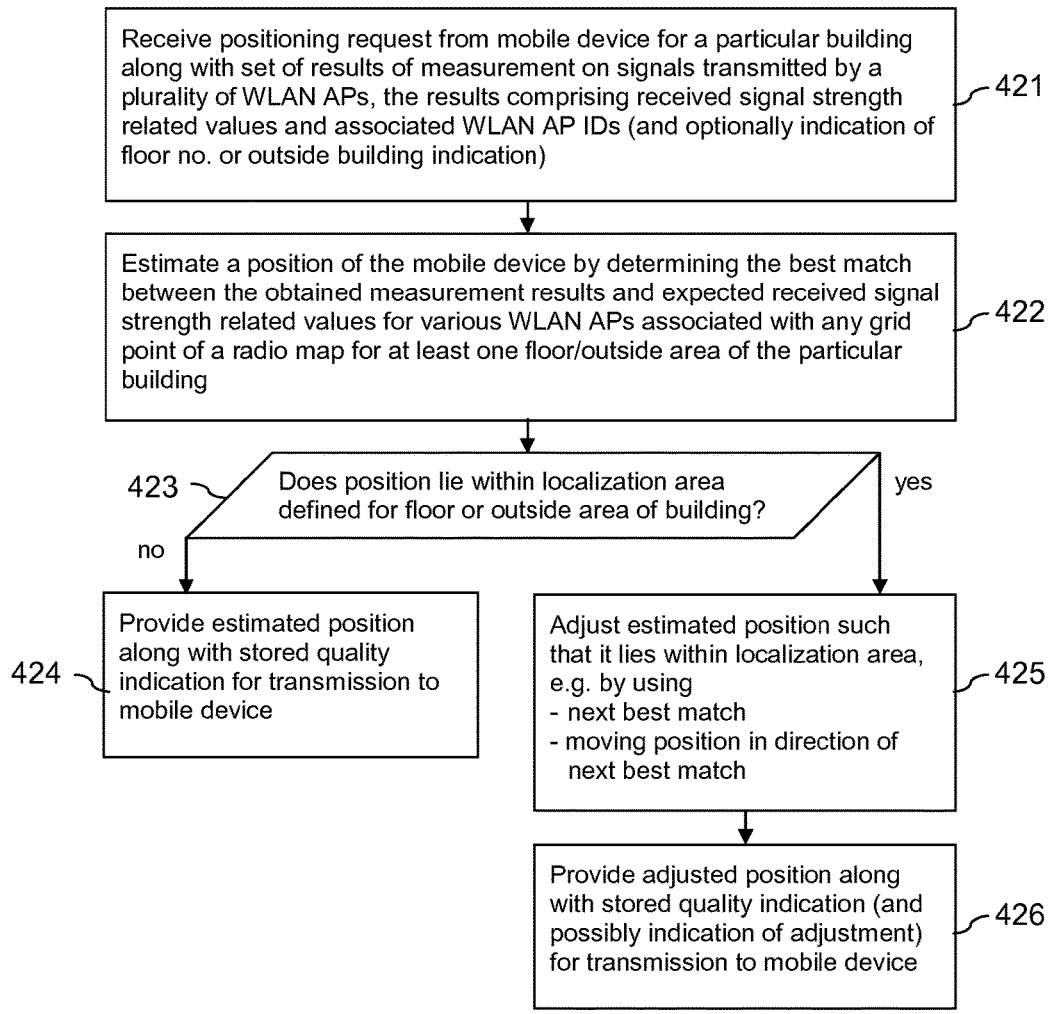
FIG. 11 is a flow chart illustrating an example embodiment of further operations in the system of FIGS. 4 and 5.

FIG. 11 is a flow chart illustrating further example operations at server 310. These example operations make use of generated radio maps for supporting a positioning of a mobile device.

Again, processor 311 and some of the program code stored in memory 312 may cause server 310 to perform the presented actions when the program code is retrieved from memory 312 and executed by processor 311.

Some application of mobile device 350 or a service provider accessed by a user via mobile device 350 may need the current position of mobile device 350. Mobile device 350 may thereupon perform measurements on signals from WLAN access points 340 that can be detected at its current location and provide the set of measurement results to server 310 along with a positioning request. The measurement results comprise received signal strength related values and the identity of the WLAN access points by which the detected signals have been transmitted. The positioning request may also include an identifier of a particular building in which the user is currently located. Such a building identifier may be input by the user of mobile device 350, or it may be obtained by mobile device 350 from one of the WLAN access points 340 of the building. Instead of a building identifier, a rough position of mobile device 350 may be indicated in the request based, for example, on a latest satellite signal based positioning that was performed by mobile device 350 before the user entered the building or a based on a cell based positioning performed by mobile device 350. Optionally, mobile device 350 may also indicate in the request the number of the floor on which it is located or an outdoor indicator.

Server 310 receives the set of measurement results and the positioning request for a particular building from mobile device 350. (action 421) If a rough position is indicated instead of a building identifier, server 310 may determine at first a building identifier of at least one building that is known to be located approximately at the indicated position.

Server 310 now estimates a position of mobile device 350. (action 422) This may be performed by finding the best match between the received signal strength related values for various WLAN access points in the received set of measurement results and all sets of received signal strength related values that are associated with the grid points of a grid of a radio map for an indicated floor or outdoor area of an indicated building—or all sets of received signal strength related values that are associated with the grid points of grids of the radio maps for all floors and outdoor areas of an indicated building or even of several determined buildings. If the quality of the radio map is high, for example since the quality has been checked and the radio map been supplemented if needed, as described with reference to FIG. 9, the estimated position may already be expected to be rather accurate.

Server 310 may furthermore determine whether the estimated position lies within a defined localization area for the floor or outdoor area, a representation of the localization area being stored in memory 314. (action 423) The position may lie outside of the localization area, for example, if a final radio map is generated for a larger area than the localization area, for instance if grid values of a final radio map are generated based on path loss models for all grid points of a standard grid, regardless of whether the grid points correspond to geographical locations in the defined localization area or not. The position may further lie outside of the localization area, for example, in case the fingerprints that were used for determining the radio map comprised errors with respect to measurement locations that were not detected as outliers.

If the estimated position is determined to lie within the localization area, the estimated position is provided for transmission to mobile device 350. (action 424) Optionally, if a final quality indication has been stored for the used radio map, the quality indication may equally be provided for transmission.

If the estimated position is determined not to lie within the localization area, in contrast, the estimated position may be adjusted such that it lies within the localization area. (action 425) This may be achieved, for instance, by using the next best match, until a position is found that lies within the localization area. Alternatively, this may be achieved, for instance, by shifting the estimated position in direction of the next best match, until a position is obtained that lies within the localization area.

Server 310 may now provide the adjusted position for transmission to mobile device 350. (action 426) Optionally, if a final quality indication has been stored for the used radio map, the quality indication may equally be provided for transmission. Furthermore, the provided adjusted position may optionally be associated with an indication of the carried out adjustment.

Mobile device 350 receives the estimated and possibly adjusted position, and the requesting application or service may use the position as needed, for instance by presenting the current position to the user of mobile device 350 or by presenting navigation information to the user of mobile device 350.

It is to be understood that instead of requesting a position from server 310, mobile device 350 may also be configured to request positioning assistance data from server 310. Server 310 may then be configured to provide mobile device 350 in response to such a request for instance with radio map data for the site at which mobile device 350 is located or with parameters of a path loss model for all WLAN access points 340 close to the current site at which mobile device 350 is located, and in addition with representations of localization areas that are stored for this site in memory 314. Mobile device 350 may then estimate its own position—either from provided radio map data as described with reference to action 422 or directly from a path loss model or by generating at first a radio map based on the path loss model—and then check based on the localization areas whether the estimated position should be adjusted or not, in line with actions 423 and 425.

It is to be understood that the presented example apparatuses as well as the presented example operations may be varied in many ways. The operations may be varied for instance by modifying actions, by omitting actions and/or by adding actions. In addition, the order of actions may be modified.

In an alternative embodiment, the fingerprints may include for example results on measurements on signals of other transmitters instead of or in addition to WLAN access point signals.

Summarized, certain embodiments of the invention allow checking the coverage of a radio map and optionally additional quality indicators of a radio map more reliably by providing an explicit localization area that should be covered by the radio map. In addition, certain embodiments of the invention may provide additional information about the topology of a site, like a building, that may be used to restrict the position estimate to lie inside the respective localization area and thus to improve indoor positioning performance.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 12:
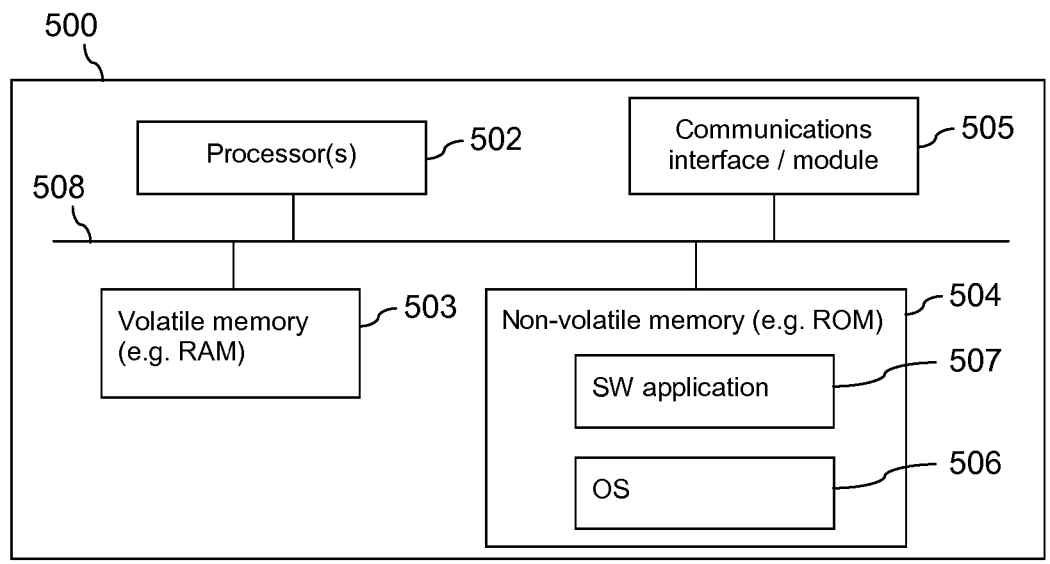
FIG. 12 is a schematic block diagram of an example embodiment of an apparatus.
Figure 13:
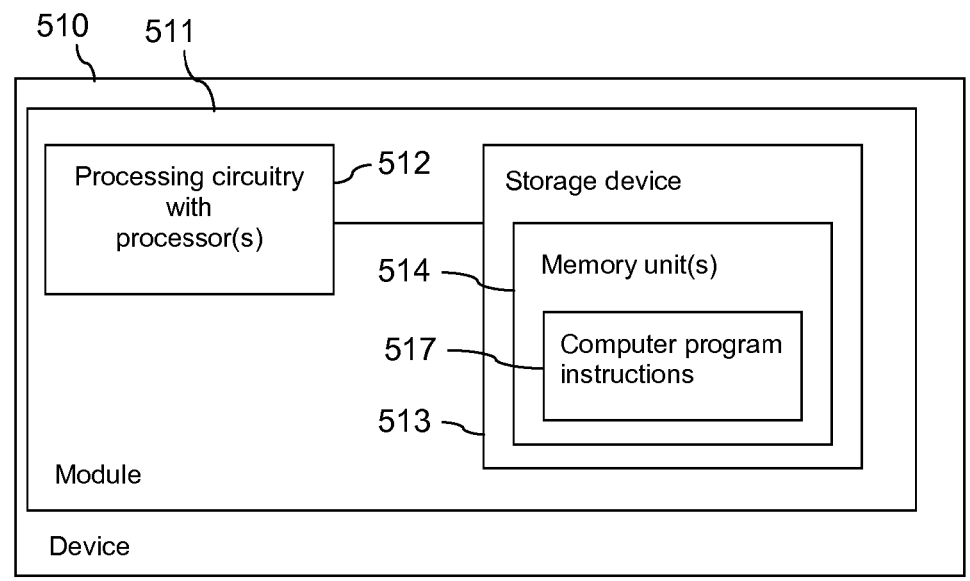
FIG. 13 is a schematic block diagram of an example embodiment of an apparatus.

Example embodiments using at least one processor and at least one memory as a non-transitory data medium are shown in FIGS. 12 and 13.

FIG. 12 is a schematic block diagram of a device 500. Device 500 includes a processor 502. Processor 502 is connected to a volatile memory 503, such as a RAM, by a bus 508. Bus 508 also connects processor 502 and RAM 503 to a non-volatile memory 504, such as a ROM. A communications interface or module 505 is coupled to bus 508, and thus also to processor 502 and memories 503, 504. Within ROM 504 is stored a software (SW) application 507. Software application 507 may be a positioning application, although it may take some other form as well. An operating system (OS) 506 also is stored in ROM 504.

FIG. 13 is a schematic block diagram of a device 510. Device 510 may take any suitable form. Generally speaking, device 510 may comprise processing circuitry 512, including one or more processors, and a storage device 513 comprising a single memory unit or a plurality of memory units 514. Storage device 513 may store computer program instructions 517 that, when loaded into processing circuitry 512, control the operation of device 510. Generally speaking, also a module 511 of device 510 may comprise processing circuitry 512, including one or more processors, and storage device 513 comprising a single memory unit or a plurality of memory units 514. Storage device 513 may store computer program instructions 517 that, when loaded into processing circuitry 512, control the operation of module 511.

The software application 507 of FIG. 12 and the computer program instructions 517 of FIG. 13, respectively, may correspond e.g. to the computer program code in any of memories 102, 302 or 312, respectively.

Figure 14:
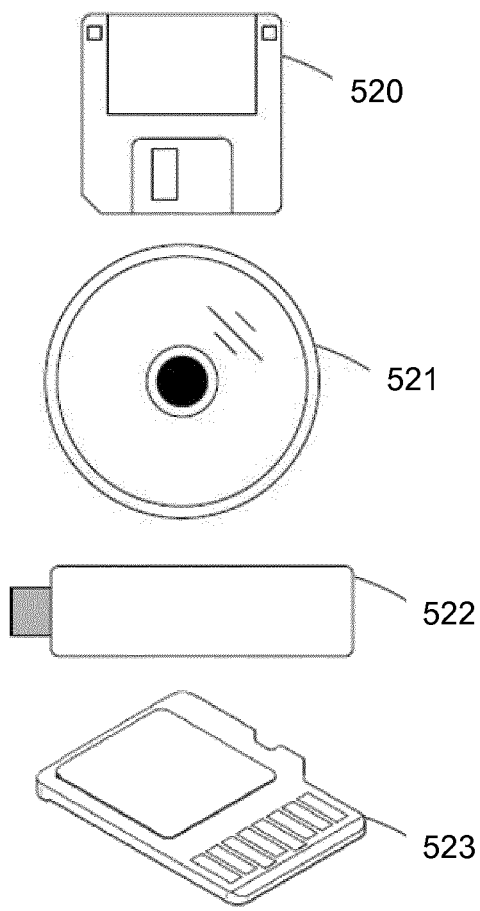
FIG. 14 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 14, which presents, from top to bottom, schematic diagrams of a magnetic disc storage 520, of an optical disc storage 521, of a semiconductor memory circuit device storage 522 and of a Micro-SD semiconductor memory card storage 523.

The functions illustrated by processor 101 in combination with memory 102, or processor 301 in combination with memory 302, or component 303 can also be viewed as means for obtaining results of measurements by a mobile device on radio signals transmitted by at least one transmitter, the results of measurements comprising characteristics of the radio signals at each of a plurality of locations of measurements at a particular site, and indications of the locations of measurement; means for providing the results of measurement and the indications of the locations as a basis for a generation of a radio map for use in supporting a positioning of mobile devices at the site; means for detecting in addition a user input to the mobile device, the user input defining a localization area at the site that is to be covered by the radio map; and means for providing in addition a representation of the defined localization area for use in connection with the radio map.

The functions illustrated by processor 101 in combination with memory 102, or processor 311 in combination with memory 312, or component 313 can also be viewed as means for obtaining results of measurements by at least one mobile device on radio signals transmitted by at least one transmitter, the results of measurements comprising characteristics of the radio signals at each of a plurality of locations of measurements at a particular site, and indications of the locations of measurement; means for generating a radio map for the site based on the obtained results of measurements and the obtained indications of the locations of measurement; means for obtaining a representation of a localization area at the site, the representation being based on a user input to at least one of the at least one mobile device defining the localization area, wherein the localization area is to be covered by the radio map; means for providing the radio map for use in supporting a positioning of mobile devices at the site; and means for providing the representation of the localization area for use in connection with the radio map.

The program codes in memories 102, 302 and 312 can also be viewed as comprising such means in the form of functional modules.

FIGS. 2, 3, 6, 9 and 11 may also be understood to represent example functional blocks of computer program codes supporting the use of radio maps.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

The invention claimed is:

1. A method comprising, performed by at least one apparatus:
   obtaining results of measurements by a mobile device on radio signals transmitted by at least one transmitter, the results of measurements comprising characteristics of the radio signals at each of a plurality of locations of measurements at a particular site, and indications of the locations of measurement;
   providing the results of measurement and the indications of the locations as a basis for a generation of a radio map for use in supporting a positioning of mobile devices at the site;
   detecting in addition a user input to the mobile device, the user input defining a localization area at the site that is to be covered by the radio map; and
   providing in addition a representation of the defined localization area for use in connection with the radio map,
   wherein the radio map is generated based on the results of the measurement and the indications of the locations, and wherein the representation of the localization area in connection with the radio map enables at least one of a determination of a degree of coverage of the radio map within the localization area or a determination of at least one indication of quality of the radio map in the localization area.

2. The method according to claim 1, wherein the localization area is defined to exclude zones of the site which are not accessible to the user for measurements by the mobile device.

3. The method according to claim 1, comprising at least one of:
   presenting a floor plan or an image on a display of the mobile device, enabling a user of the mobile device to draw curves in the presented floor plan or image for marking zones that belong to the localization area, and detecting the drawn curves as the user input;
   presenting a floor plan or image on a display of the mobile device, enabling a user of the mobile device to draw curves in the presented floor plan or image for marking zones that belong to the localization area, detecting the drawn curves as the user input, and generating a representation of the localization area by determining grid points of a grid lying within a predetermined distance to the curves, assigning a first value to the determined grid points of the grid and assigning a second value to remaining grid points of the grid;
   presenting a floor plan or image on a display of the mobile device, enabling a user of the mobile device to draw curves in the presented floor plan or image for marking zones that do not belong to the localization area, and detecting the drawn curves as the user input;
   presenting a floor plan or image on a display of the mobile device, enabling a user of the mobile device to draw curves in the presented floor plan or image for marking zones that do not belong to the localization area, detecting the drawn curves as the user input, and generating a representation of the localization area by determining grid points of a grid lying within a predetermined distance to the curves, assigning a first value to the determined grid points of the grid and assigning a second value to remaining grid points of the grid;
   presenting grid points of a grid on a display of the mobile device, enabling the user to select grid points of the grid which are associated with zones that belong to the localization area, and detecting the selected grid points as the user input;
   presenting grid points of a grid on a display of the mobile device, enabling the user to select grid points of the grid which are associated with zones that belong to the localization area, detecting the selected grid points as the user input, and generating a representation of the localization area by assigning a first value to selected grid points and a second value to non-selected grid points;
   presenting grid points of a grid on a display of the mobile device, enabling the user to select grid points of the grid which are associated with zones that do not belong to the localization area, and detecting the selected grid points as the user input;
   presenting grid points of a grid on a display of the mobile device, enabling the user to erase grid points of the grid which are associated with zones that do not belong to the localization area, detecting the selected grid points as the user input, and generating a representation of the localization area by assigning a first value to selected grid points and a second value to non-selected grid points:
   presenting a grid on a display of the mobile device, enabling the user to select grid tiles of the grid which correspond to zones that belong to the localization area, and detecting the selected grid tiles as the user input; or
   presenting a grid on a display of the mobile device, enabling the user to select grid tiles of the grid which correspond to zones that do not belong to the localization area, and detecting the selected grid tiles as the user input; or at least one of:
   enabling a user to define polygons on a display of the mobile device, the polygons representing a delimitation of zones that belong to the localization area, and detecting the definition of the polygons as the user input;
   enabling a user to define polygons on a display of the mobile device based on polygons defining a floor plan presented on the display, the polygons representing a delimitation of zones that belong to the localization area, and detecting the definition of the polygons as the user input;
   enabling a user to define polygons on a display of the mobile device, the polygons representing a delimitation of zones that do not belong to the localization area, and detecting the definition of the polygons as the user input; or
   enabling a user to define polygons on a display of the mobile device based on polygons defining a floor plan presented on the display, the polygons representing a delimitation of zones that do not belong to the localization area, and detecting the definition of the polygons as the user input.

4. The method according to claim 1, further comprising generating a radio map based on the measurement results and the indications of the locations and using the representation of the localization area in connection with the radio map by at least one of:
- determining the degree of coverage of the radio map within the localization area;
- determining the degree of coverage of the radio map within the localization area and causing a request for additional measurements in the localization area in case the determined degree of coverage falls short of a predetermined value;
- determining the at least one indication of quality of the radio map in the localization area;
- determining the at least one indication of quality of the radio map in the localization area and causing a request for additional measurements in the localization area in case at least one of the at least one indication of quality falls short of a predetermined value;
- determining the at least one indication of quality of the radio map in the localization area and causing storage of the at least one indication of quality as information on a quality of a positioning that is based on the radio map; or
- determining a position of a mobile device based on the radio map, while limiting possible positions of the mobile device to the localization area.

5. A method comprising, performed by at least one apparatus:
- obtaining results of measurements by at least one mobile device on radio signals transmitted by at least one transmitter, the results of measurements comprising characteristics of the radio signals at each of a plurality of locations of measurements at a particular site, and indications of the locations of measurement;
- generating a radio map for the site based on the obtained results of measurements and the obtained indications of the locations of measurement;
- obtaining a representation of a localization area at the site, the representation being based on a user input to at least one of the at least one mobile device defining the localization area, wherein the localization area is to be covered by the radio map, wherein the representation of the localization area in connection with the radio map enables at least one of a determination of a degree of coverage of the radio map within the localization area or a determination of at least one indication of quality of the radio map in the localization area;
- providing the radio map for use in supporting a positioning of mobile devices at the site; and
- providing the representation of the localization area for use in connection with the radio map.

6. The method according to claim 5, wherein the represented localization area excludes zones of the site which are not accessible to the user for measurements.

7. The method according to claim 5, wherein the localization area is represented by at least one of:
- grid points of a grid having an assigned predetermined value, the grid points associated with zones that are to be covered by the radio map;
- grid points of a grid having an assigned predetermined value, the grid points associated with zones that are not to be covered by the radio map;
- grid tiles of a grid which correspond to zones that are to be covered by the radio map;
- grid tiles of a grid which correspond to zones that are not to be covered by the radio map;
- polygons delimiting zones that are not to be covered by the radio map;
- vertices defining polygons delimiting zones that are to be covered by the radio map; or
- vertices defining polygons delimiting zones that are not to be covered by the radio map.

8. The method according to claim 5, further comprising at least one of:
- determining the degree of coverage of the radio map within the localization area;
- determining the degree of coverage of the radio map within the localization area and causing a request for additional measurements in the localization area in case the determined degree of coverage falls short of a predetermined value;
- determining at least one indication of quality of the radio map in the localization area;
- determining at least one indication of quality of the radio map in the localization area and causing a request for additional measurements in the localization area in case at least one of the at least one indication of quality falls short of a predetermined value;
- determining at least one indication of quality of the radio map in the localization area and causing storage of the at least one indication of quality as information on a quality of a positioning that is based on the radio map; or
- determining a position of a mobile device based on the radio map, while limiting possible positions of the mobile device to the localization area.

9. An apparatus comprising at least one processor and at least one memory including computer program code, the at least one memory and the computer program code configured to, with the at least one processor, cause the apparatus at least to perform:
- obtain results of measurements by a mobile device on radio signals transmitted by at least one transmitter, the results of measurements comprising characteristics of the radio signals at each of a plurality of locations of measurements at a particular site, and indications of the locations of measurement;
- provide the results of measurement and the indications of the locations as a basis for a generation of a radio map for use in supporting a positioning of mobile devices at the site;
- detect in addition a user input to the mobile device, the user input defining a localization area at the site that is to be covered by the radio map; and
- provide in addition a representation of the defined localization area for use in connection with the radio map, wherein the radio map is generated based on the results of the measurement and the indications of the locations, and wherein the representation of the localization area in connection with the radio map enables at least one of a determination of a degree of coverage of the radio map within the localization area or a determination of at least one indication of quality of the radio map in the localization area.

10. The apparatus according to claim 9, wherein the localization area is defined to exclude zones of the site which are not accessible to the user for measurements by the mobile device.

11. The apparatus according to claim 9, wherein the at least one memory and the computer program code are configured to, with the at least one processor, cause the apparatus to at least one of:

present a floor plan or image on a display of the mobile device, enable a user of the mobile device to draw curves in the presented floor plan or image for marking zones that belong to the localization area, and detect the drawn curves as the user input;

present a floor plan or image on a display of the mobile device, enable a user of the mobile device to draw curves in the presented floor plan or image for marking zones that belong to the localization area, detect the drawn curves as the user input, and generate a representation of the localization area by determining grid points of a grid lying within a predetermined distance to the curves, assigning a first value to the determined grid points of the grid and assigning a second value to remaining grid points of the grid;

present a floor plan or image on a display of the mobile device, enable a user of the mobile device to draw curves in the presented floor plan or image for marking zones that do not belong to the localization area, and detect the drawn curves as the user input;

present a floor plan or image on a display of the mobile device, enable a user of the mobile device to draw curves in the presented floor plan or image for marking zones that do not belong to the localization area, detect the drawn curves as the user input, and generate a representation of the localization area by determining grid points of a grid lying within a predetermined distance to the curves, assigning a first value to the determined grid points of the grid and assigning a second value to remaining grid points of the grid;

present grid points of a grid on a display of the mobile device, enable the user to select grid points of the grid which are associated with zones that belong to the localization area, and detect the selected grid points as the user input;

present grid points of a grid on a display of the mobile device, enable the user to select grid points of the grid which are associated with zones that belong to the localization area, detect the selected grid points as the user input, and generate a representation of the localization area by assigning a first value to selected grid points and a second value to non-selected grid points;

present grid points of a grid on a display of the mobile device, enable the user to select grid points of the grid which are associated with zones that do not belong to the localization area, and detect the selected grid points as the user input;

present grid points of a grid on a display of the mobile device, enable the user to erase grid points of the grid which are associated with zones that do not belong to the localization area, detect the selected grid points as the user input, and generate a representation of the localization area by assigning a first value to selected grid points and a second value to non-selected grid points:

present a grid on a display of the mobile device, enable the user to select grid tiles of the grid which correspond to zones that belong to the localization area, and detect the selected grid tiles as the user input; or present a grid on a display of the mobile device, enable the user to select grid tiles of the grid which correspond to zones that do not belong to the localization area, and detect the selected grid tiles as the user input; or at least one of enable a user to define polygons on a display of the mobile device, the polygons representing a delimitation of zones that belong to the localization area, and detect the definition of the polygons as the user input;

enable a user to define polygons on a display of the mobile device based on polygons defining a floor plan presented on the display, the polygons representing a delimitation of zones that belong to the localization area, and detect the definition of the polygons as the user input;

enable a user to define polygons on a display of the mobile device, the polygons representing a delimitation of zones that do not belong to the localization area, and detect the definition of the polygons as the user input; or enable a user to define polygons on a display of the mobile device based on polygons defining a floor plan presented on the display, the polygons representing a delimitation of zones that do not belong to the localization area, and detect the definition of the polygons as the user input.

12. The apparatus according to claim 9, wherein the at least one memory and the computer program code are further configured to, with the at least one processor, cause the apparatus to at least one of:

determine the degree of coverage of the radio map within the localization area;

determine the degree of coverage of the radio map within the localization area and cause a request for additional measurements in the localization area in case the determined degree of coverage falls short of a predetermined value;

determine at least one indication of quality of the radio map in the localization area;

determine at least one indication of quality of the radio map in the localization area and cause a request for additional measurements in the localization area in case at least one of the at least one indication of quality falls short of a predetermined value;

determine at least one indication of quality of the radio map in the localization area and cause storage of the at least one indication of quality as information on a quality of a positioning that is based on the radio map; or determine a position of a mobile device based on the radio map, while limiting possible positions of the mobile device to the localization area.

13. The apparatus according to claim 9, wherein the at least one transmitter comprises at least one of:

at least one terrestrial transmitter;
at least one terrestrial cellular transmitter;
at least one terrestrial non-cellular transmitter;
at least one access point of at least one wireless local area network;
at least one Bluetooth transmitter; or
at least one Bluetooth low energy transmitter.

14. The apparatus according to claim 9, wherein the characteristics of signals comprise a value relating to a received signal strength of a signal from a respective transmitter at the mobile device and an identifier of the respective transmitter.

15. An apparatus comprising at least one processor and at least one memory including computer program code, the at least one memory and the computer program code configured to, with the at least one processor, cause the apparatus at least to perform:

obtain results of measurements by at least one mobile device on radio signals transmitted by at least one transmitter, the results of measurements comprising characteristics of the radio signals at each of a plurality of locations of measurements at a particular site, and indications of the locations of measurement;

generate a radio map for the site based on the obtained results of measurements and the obtained indications of the locations of measurement;

obtain a representation of a localization area at the site, the representation being based on a user input to at least one of the at least one mobile device defining the localization area, wherein the localization area is to be covered by the radio map, wherein the representation of the localization area in connection with the radio map enables at least one of a determination of a degree of coverage of the radio map within the localization area or a determination of at least one indication of quality of the radio map in the localization area;

provide the radio map for use in supporting a positioning of mobile devices at the site; and provide the representation of the localization area for use in connection with the radio map.

16. The apparatus according to claim 15, wherein the represented localization area excludes zones of the site which are not accessible to the user for measurements.

17. The apparatus according to claim 15, wherein the localization area is represented by at least one of:

grid points of a grid having an assigned predetermined value, the grid points associated with zones that are to be covered by the radio map;

grid points of a grid having an assigned predetermined value, the grid points associated with zones that are not to be covered by the radio map;

grid tiles of a grid which correspond to zones that are to be covered by the radio map;

grid tiles of a grid which correspond to zones that are not to be covered by the radio map;

polygons delimiting zones that are to be covered by the radio map;

polygons delimiting zones that are not to be covered by the radio map;

vertices defining polygons delimiting zones that are to be covered by the radio map; or vertices defining polygons delimiting zones that are not to be covered by the radio map.

18. The apparatus according to claim 15, wherein the at least one memory and the computer program code are further configured to, with the at least one processor, cause the apparatus to at least one of:

determine the degree of coverage of the radio map within the localization area;

determine the degree of coverage of the radio map within the localization area and cause a request for additional measurements in the localization area in case the determined degree of coverage falls short of a predetermined value;

determine at least one indication of quality of the radio map in the localization area;

determine at least one indication of quality of the radio map in the localization area and cause a request for additional measurements in the localization area in case at least one of the at least one indication of quality falls short of a predetermined value;

determine at least one indication of quality of the radio map in the localization area and cause storage of the at least one indication of quality as information on a quality of a positioning that is based on the radio map; or determine a position of a mobile device based on the radio map, while limiting possible positions of the mobile device to the localization area.

19. The apparatus according to claim 15, wherein at least one transmitter comprises at least one of:

at least one terrestrial transmitter;
at least one terrestrial cellular transmitter;
at least one terrestrial non-cellular transmitter;
at least one access point of at least one wireless local area network;
at least one Bluetooth transmitter; or
at least one Bluetooth low energy transmitter.

20. The apparatus according to claim 15, wherein the characteristics of signals comprise a value relating to a received signal strength of a signal from a respective transmitter at the mobile device and an identifier of the respective transmitter.

21. A non-transitory computer readable storage medium in which computer program code is stored, the computer program code causing an apparatus to perform the following when executed by a processor:

obtain results of measurements by a mobile device on radio signals transmitted by at least one transmitter, the results of measurements comprising characteristics of the radio signals at each of a plurality of locations of measurements at a particular site, and indications of the locations of measurement;

provide the results of measurement and the indications of the locations as a basis for a generation of a radio map for use in supporting a positioning of mobile devices at the site, wherein the radio map is generated based on the measurement results and the indications of the locations and using the representation of the localization area in connection with the radio map by at least one of determining a degree of coverage of the radio map within the localization area and determining at least one indication of quality of the radio map in the localization area;

detect in addition a user input to the mobile device, the user input defining a localization area at the site that is to be covered by the radio map; and provide in addition a representation of the defined localization area for use in connection with the radio map.

22. A non-transitory computer readable storage medium in which computer program code is stored, the computer program code causing an apparatus to perform the following when executed by a processor:

obtain results of measurements by at least one mobile device on radio signals transmitted by at least one transmitter, the results of measurements comprising characteristics of the radio signals at each of a plurality of locations of measurements at a particular site, and indications of the locations of measurement;

generate a radio map for the site based on the obtained results of measurements and the obtained indications of the locations of measurement;

obtain a representation of a localization area at the site, the representation being based on a user input to at least one of the at least one mobile device defining the localization area, wherein the localization area is to be covered by the radio map, wherein the representation of the localization area in connection with the radio map enables at least one of a determination of a degree of coverage of the radio map within the localization area or a determination of at least one indication of quality of the radio map in the localization area;

provide the radio map for use in supporting a positioning of mobile devices at the site; and provide the representation of the localization area for use in connection with the radio map.

\* \* \* \* \*